(12) United States Patent
Churchvara et al.

(10) Patent No.: US 11,555,576 B2
(45) Date of Patent: Jan. 17, 2023

(54) STATIONARY TRANSFER PLATFORM AND CLEANING DEVICE FOR SUPPLY TRANSPORT DEVICE

(71) Applicant: Veltek Associates, Inc., Malvern, PA (US)

(72) Inventors: Jeffrey Churchvara, Downingtown, PA (US); Arthur L. Vellutato, Jr., Malvern, PA (US); Yefim Gudesblat, Exton, PA (US); Vladislav Gudesblat, Exton, PA (US)

(73) Assignee: Veltek Associates, Inc., Malvern, PA (US)

( * ) Notice: Subject to any disclaimer, the term of this patent is extended or adjusted under 35 U.S.C. 154(b) by 0 days.

(21) Appl. No.: 15/637,059

(22) Filed: Jun. 29, 2017

(65) Prior Publication Data

US 2017/0356593 A1    Dec. 14, 2017

Related U.S. Application Data

(63) Continuation-in-part of application No. 15/190,682, filed on Jun. 23, 2016, now Pat. No. 9,994,244, which
(Continued)

(51) Int. Cl.
*B62B 3/02* (2006.01)
*F16M 11/22* (2006.01)
(Continued)

(52) U.S. Cl.
CPC .............. *F16M 11/22* (2013.01); *B60S 3/047* (2013.01); *B62B 3/002* (2013.01); *B62B 3/005* (2013.01);
(Continued)

(58) Field of Classification Search
CPC ...... B65G 65/00; B65G 69/045; B65G 61/00; B65G 67/00; B62B 3/02; B62B 3/002;
(Continued)

(56) References Cited

U.S. PATENT DOCUMENTS

| 274,258 A | 3/1883 | Bedell |
| 1,103,689 A | 7/1914 | Russell |

(Continued)

FOREIGN PATENT DOCUMENTS

| CN | 200957804 Y | 10/2007 |
| CN | 201745633 U | 2/2011 |

(Continued)

OTHER PUBLICATIONS

International Preliminary Report on Patentability issued in PCT/US2015/067110 dated May 20, 2017.
(Continued)

*Primary Examiner* — James M Dolak
*Assistant Examiner* — James J Triggs
(74) *Attorney, Agent, or Firm* — Blank Rome LLP

(57) ABSTRACT

A stationary platform for supporting a supply transport device is provided. The stationary platform includes a frame having at least two longitudinal sides, a first end and a second opposing end, and a top surface and a bottom surface, and a plurality of legs extending from the bottom surface of the frame to support the supply transport device on the frame. The supply transport device is slidably received on the top surface of the frame. A wheel base assembly having a cleaning device for contacting a bottom surface of the supply transport device, to remove dirt and debris from or to disinfect the supply transport device, is also provided.

27 Claims, 13 Drawing Sheets

Related U.S. Application Data is a continuation-in-part of application No. 14/979,330, filed on Dec. 22, 2015.

(60) Provisional application No. 62/109,873, filed on Jan. 30, 2015, provisional application No. 62/096,648, filed on Dec. 24, 2014.

(51) Int. Cl.
| | |
|---|---|
| *B62B 3/00* | (2006.01) |
| *B62B 5/00* | (2006.01) |
| *B60S 3/04* | (2006.01) |
| *B62B 5/04* | (2006.01) |
| *B62B 3/04* | (2006.01) |
| *B62B 3/10* | (2006.01) |

(52) U.S. Cl.
CPC ............... *B62B 3/02* (2013.01); *B62B 3/04* (2013.01); *B62B 5/00* (2013.01); *B62B 5/0442* (2013.01); *B62B 3/10* (2013.01); *B62B 5/0447* (2013.01); *B62B 2202/30* (2013.01); *B62B 2202/90* (2013.01); *B62B 2203/74* (2013.01)

(58) Field of Classification Search
CPC ..... B62B 2202/90; B62B 5/0447; B62B 3/10; B62B 5/00; B62B 3/005; B62B 2202/30; F16M 11/22; B60S 3/047
See application file for complete search history.

(56) References Cited

U.S. PATENT DOCUMENTS

| | | | |
|---|---|---|---|
| 1,750,129 A | 3/1930 | Romine | |
| 2,507,732 A | 5/1950 | Morgan | |
| 2,790,196 A | 4/1957 | Rideout et al. | |
| 3,023,021 A | 2/1962 | Fricke et al. | |
| 3,125,353 A | 3/1964 | Gohmann | |
| 3,137,250 A | 6/1964 | Hutchinson | |
| 3,521,568 A * | 7/1970 | Takahashi | B61B 10/04 |
| | | | 104/172.2 |
| 3,698,733 A | 10/1972 | Isaacs | |
| 3,759,538 A | 9/1973 | Fabiano | |
| 3,869,052 A | 3/1975 | Leahy | |
| 3,934,895 A | 1/1976 | Fox | |
| 4,109,926 A | 8/1978 | Lane | |
| 4,222,580 A | 9/1980 | Krokonko | |
| 4,354,791 A | 10/1982 | Antonellis | |
| 4,436,700 A | 3/1984 | Erickson | |
| 4,557,201 A | 12/1985 | Webb, Jr. | |
| 4,670,227 A | 6/1987 | Smith | |
| 4,687,404 A * | 8/1987 | Seiz | B65G 1/06 |
| | | | 211/151 |
| 4,819,767 A | 4/1989 | Laird | |
| 5,072,960 A | 12/1991 | Sperko | |
| 5,175,014 A * | 12/1992 | Brockwell | A01J 25/162 |
| | | | 426/512 |
| 5,183,368 A * | 2/1993 | Douard | B61B 5/02 |
| | | | 198/465.1 |
| 5,236,066 A | 8/1993 | O'Neal et al. | |
| 5,312,004 A * | 5/1994 | Krummell | A47B 53/00 |
| | | | 211/151 |
| 5,419,444 A | 5/1995 | Strom | |
| 5,421,604 A | 6/1995 | Wu | |
| 5,667,236 A | 9/1997 | Murphy | |
| 5,735,367 A | 4/1998 | Brubaker | |
| 5,758,888 A | 6/1998 | Burgan et al. | |
| 6,027,190 A | 2/2000 | Stewart et al. | |
| 6,042,127 A | 3/2000 | Rupolo | |
| 6,095,348 A | 8/2000 | Karashima | |
| 6,247,769 B1 | 6/2001 | Spitzer et al. | |
| 6,394,743 B1 * | 5/2002 | Marsden | B62B 3/008 |
| | | | 280/79.3 |
| 6,398,283 B1 | 6/2002 | Knudtson et al. | |
| 6,416,143 B1 | 7/2002 | Janson | |
| 6,695,564 B2 | 2/2004 | Pfisterer | |
| 7,673,889 B2 | 3/2010 | Wells et al. | |
| 8,104,775 B2 | 1/2012 | Hadar et al. | |
| 9,108,661 B2 | 8/2015 | Suess | |
| 9,216,752 B1 | 12/2015 | Carruyo | |
| 10,518,793 B2 * | 12/2019 | Churchvara | B62B 3/04 |
| 10,625,933 B2 | 4/2020 | Pham | |
| 2002/0109368 A1 | 8/2002 | Mink et al. | |
| 2003/0205875 A1 | 11/2003 | Ondrasik et al. | |
| 2003/0205878 A1 | 11/2003 | Martis et al. | |
| 2004/0011000 A1 | 1/2004 | Lagerstedt | |
| 2004/0207168 A1 | 10/2004 | Raab et al. | |
| 2005/0012286 A1 | 1/2005 | Woodrow | |
| 2006/0119080 A1 | 6/2006 | Damron | |
| 2007/0272518 A1 * | 11/2007 | Gaarden | B65G 45/12 |
| | | | 198/499 |
| 2008/0042378 A1 | 2/2008 | Dick et al. | |
| 2011/0253656 A1 | 10/2011 | Vermeer | |
| 2012/0194050 A1 | 8/2012 | Suess | |
| 2012/0315117 A1 | 12/2012 | Gilland | |
| 2013/0146553 A1 | 6/2013 | Preidt et al. | |
| 2015/0028616 A1 | 1/2015 | Kroening et al. | |
| 2016/0297458 A1 | 10/2016 | Churchvara et al. | |
| 2019/0282058 A1 | 9/2019 | Rouillard et al. | |

FOREIGN PATENT DOCUMENTS

| | | |
|---|---|---|
| CN | 201914897 U | 8/2011 |
| CN | 102177062 A | 9/2011 |
| CN | 204605897 U | 9/2015 |
| CN | 106458440 A | 2/2017 |
| CN | 107207026 A | 9/2017 |
| DE | 10065375 A1 | 7/2002 |
| DE | 202009004554 U1 | 7/2009 |
| DE | 202009004554 U1 | 8/2009 |
| DE | 102011107329 A1 | 11/2011 |
| DE | 202013102199 U1 | 6/2013 |
| EP | 0314176 A2 | 5/1989 |
| EP | 1059050 A2 | 12/2000 |
| FR | 662367 A | 8/1929 |
| GB | 674662 A | 6/1952 |
| GB | 2366258 A | 3/2002 |
| JP | S52103555 U | 8/1977 |
| JP | S541882 U | 1/1979 |
| JP | 57-73269 | 5/1982 |
| JP | S57-73269 U | 5/1982 |
| JP | 60-6667 | 1/1985 |
| JP | S62502040 A | 8/1987 |
| JP | H02127588 U | 10/1990 |
| JP | H03052602 Y2 | 11/1991 |
| JP | H05000044 U | 1/1993 |
| JP | H05040077 U | 5/1993 |
| JP | H6-3771 U | 1/1994 |
| JP | 1995-231523 A | 8/1995 |
| JP | H0988952 A | 3/1997 |
| JP | 2001030910 A | 2/2001 |
| JP | 2004/131001 A | 4/2004 |
| JP | 2004286206 A | 10/2004 |
| JP | 2005125858 A | 5/2005 |
| JP | 2005178432 A | 7/2005 |
| JP | 2006055230 A | 3/2006 |
| JP | 3124422 U | 8/2006 |
| JP | 2007061533 A | 3/2007 |
| JP | 3132308 U | 6/2007 |
| JP | 2007137254 A | 6/2007 |
| JP | 4290542 B2 | 7/2009 |
| JP | 2012206607 A | 10/2012 |
| WO | WO-2016/106219 A1 | 6/2016 |

OTHER PUBLICATIONS

International Search Report and Written Opinion issued in PCT/US2015/067110 dated May 20, 2016, 12 pages.
International Search Report and Written Opinion issued in PCT/US2017/037923 dated Jul. 14, 2017, 11 pages.
English-langugage Translation of Japanese of Action for JP2017-534327, dated May 16, 2018, 3 pages.
IPER for PCT/US2017/037923 dated Jan. 3, 2019 (7 pages).

(56) References Cited

OTHER PUBLICATIONS

Supplementary European Search Report for EP15874251 dated Oct. 9, 2018.
Korean Office Action for KR-10-2017-7014768, dated Sep. 3, 2018, 8 pages.
Examination Report for New Zealnd Application No. 732617, dated Jul. 25, 2018, 3 pages.
English-language translation of Office Action for Chinese Patent Application No. 201580069038.7, dated Sep. 4, 2018, 5 pages.
International Search Report and Written Opinion for PCT/US18/38712, dated Aug. 3, 2018, 11 pages.
Supplementary European Search Report for EP17815974, dated Dec. 10, 2019, 11 pages.
JP Office Action dated Apr. 22, 2020 cited in Japanese Patent Application No. 2019-106526.
Japanese Office Action & Translation of JP Application No. 2018-566218, dated Aug. 17, 2020.
Chinese Office Action & Translation of CN Application No. 2017800373121, dated Sep. 16, 2020.
Written Opinion for Singapore Application No. 11201910990-U, dated Jan. 25, 2021, 8 pgs.
Japanese Office Action & Translation of JP Application No. 2018-566218, dated Dec. 22, 2020, 5 pgs.
Office Action issued in relate Japanese application No. 2018-566218 dated Apr. 23, 2021, with translation.
Office Action issued in related Japanese application No. 2018-566218 dated Apr. 23, 2021, with translation.
First Examination Report for IN Application No. 201917047848, dated Jul. 12, 2021.
Office Action for CA Application No. 3028485, dated Jan. 13, 2022.
Office Action for JP Application No. 2020-188174, dated Jun. 29, 2021.
Office Action for JP Application No. 2020-188175, dated Aug. 11, 2021.
Office Action for JP Application No. 2019-571745, dated Aug. 27, 2021.
Office Action for JP Application No. 2020-201643, dated Jan. 12, 2022.
Office Action for EP Application No. 17815974.5, dated Nov. 11, 2021.
Search Report for SG Application No. 10202005805R, dated Dec. 6, 2021.
Chinese Office Action CN Application No. 2018800441227, dated Oct. 13, 2021, 4 pgs.
Office Action for CN Application No. 202010902516.0, dated Mar. 9, 2022.
Office Action for JP Application No. 2020-188174, dated Mar. 1, 2022.
Examination Report for AU Application No. 2017280954, dated Apr. 4, 2022.
Office Action for EP Application No. 17815974.5, dated Jul. 5, 2022.
Office Action for CN Application No. 202010902516.0, dated Aug. 29, 2022.
Office Action for JP Application No. 2020-188174, dated Oct. 3, 2022.
Office Action for KR Application No. 10-2020-7000518, dated Aug. 31, 2022.
Office Action for NZ Application No. 748864, dated Sep. 22, 2022.
Office Action received in EP Application No. 18824388.5, dated Jul. 25, 2022.
Office Action received in SG Application No. 10202005805R, dated Aug. 4, 2022
Supplementary Partial European Search Report for EP 18824388, dated May 3, 2021, 9 pgs.

* cited by examiner

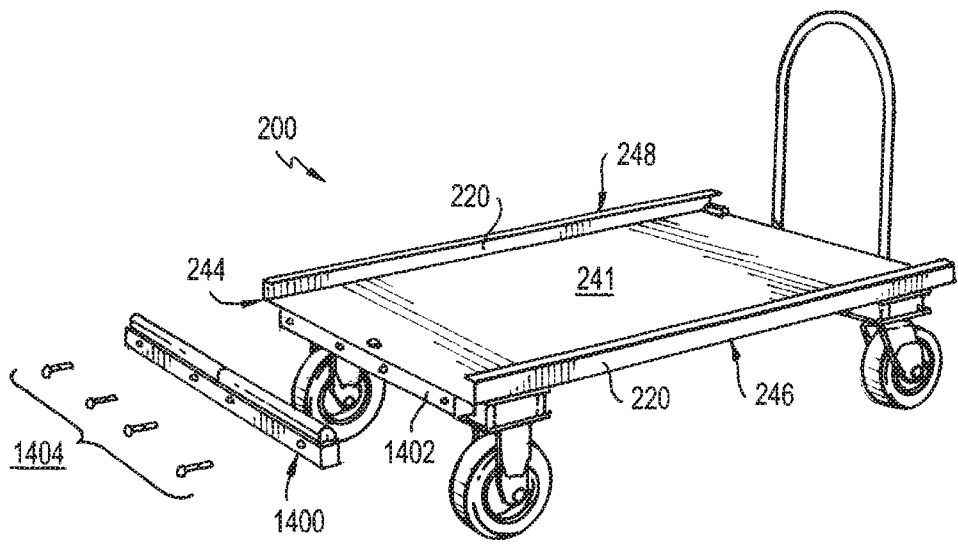
FIG. 14B
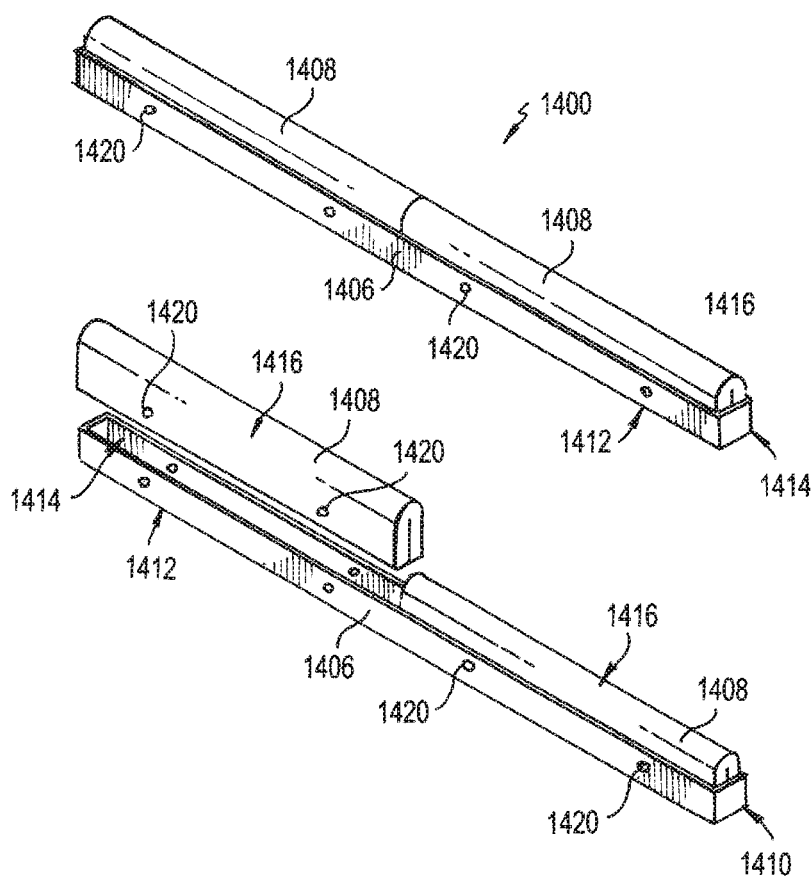
FIG. 15A
FIG. 15B under. The stationary platform includes a frame having at least two longitudinal sides, a first end and a second opposing end, and a top surface and a bottom surface, and a plurality of legs extending from the bottom surface of the frame to support the supply transport device on the frame. The supply transport device is slidably received on the top surface of the frame. The wheel base assembly includes a platform and a plurality of wheels attached thereto and is configured to transport a supply transport device to the stationary platform. The

STATIONARY TRANSFER PLATFORM AND CLEANING DEVICE FOR SUPPLY TRANSPORT DEVICE

RELATED APPLICATIONS

This application is a continuation-in-part of U.S. patent application Ser. No. 15/190,682, filed Jun. 23, 2016, which is a continuation-in-part of U.S. patent application Ser. No. 14/979,330, filed Dec. 22, 2015, which claims the benefit of U.S. Provisional Application No. 62/096,648, filed Dec. 24, 2014, and 62/109,873, filed Jan. 30, 2015. The entire contents of those applications are incorporated herein by reference.

FIELD OF THE INVENTION

The present invention relates to the field of clean room equipment. More particularly, the present invention is directed to equipment for the transport and temporary holding or storage of items from a non-sterile environment to a sterile environment and vice versa

BACKGROUND OF THE INVENTION

A controlled environment (such as a clean room) is an area or environment in which the level of contaminants or particles is controlled, such as by filtering particulate matter from air that enters the room. Controlled environments have low levels of contaminants or particles, and are used to manufacture certain products and conduct research. These controlled environments are used to ensure that organic and inorganic contaminants from the outside environments do not compromise the goods or equipment being manufactured or utilized. However, it can be difficult to transport into the controlled environment, the various items (such as supplies, raw materials, etc.) that are needed in the controlled environment to assist in the manufacture, without contaminating the controlled environment or otherwise introducing particles into the controlled environment.

Clean rooms can also use such features as positive pressure and humidity controls to optimize the environment for the task for which they have been designed. Clean rooms can have a variety of sizes, and can also have an airlock or staging area formed outside of the entry point. The airlock or staging area sequesters the air inside the clean room from the outside environment. Clean rooms are currently classified using filtration criteria that examines the number and size of particles admitted in a given air volume. Known clean room standards in the United States include US FED 209E classes, ISO 14644-1 classes, and ISO 14644-2 classes. Other countries may use separate standards or guidelines.

Autoclaving is one technique for cleaning the goods and equipment that are transported into the controlled environment. An autoclave is a device that is used to sterilize goods and equipment through the use of pressure and/or heat in the form of steam or superheated water. Autoclaving can also be carried out in a vacuum. Autoclaves can have a variety of sizes, depending on the media to be sterilized. Because the goods and equipment in the autoclave are subjected to high levels of heat, pressure, and moisture, any media subjected to such treatment must be able to withstand both.

Clean room personnel will often use supply transport devices, such as carts, to transport items to/from a clean room. However, the cart cannot enter the clean room because the wheels attract dirt that would introduce undesirable particles into the clean room. Consequently, personnel must stop the cart outside the clean room entry point (or inside the staging area), then manually transfer trays and/or goods from the cart to inside the sterile environment. A second cart can sometimes be provided inside the clean room, and the goods can be transferred to/from the cart located inside the clean room to/from the cart located outside the clean room. This transfer is necessary to ensure that the cart situated outside the clean environment does not enter and contaminate the sterile clean room. However, such conventional, manual transfers between environments involves a number of risks and difficulties including: (1) the possibility that goods will be dropped or spilled; (2) the possibility that accidental handling of the goods will compromise sterility; (3) the need for additional individuals to assist in the transfer and transport of goods; and (4) can be time-consuming and labor intensive.

Additionally, the transfer of carts requires that there be a means of storing carts, either within or outside of the clean room environment, when they are not in use.

SUMMARY OF THE INVENTION

Accordingly, it is an object of the invention to provide a transport that can be used by a single operator to transport goods and equipment. Another object of the present invention is to provide a transport device that can be moved from an uncontrolled environment (e.g., outside a clean room) to inside a controlled environment (e.g., a clean room), and to transport goods from an uncontrolled environment to inside a clean room environment. It is a further object of the invention to provide a cart that has a removable wheel base, such that a single operator can replace the non-sterile wheel base with a sterile wheel base as goods or equipment are transported between an uncontrolled environment and a controlled environment, while preventing the non-sterile wheel base from entering the controlled environment. It is yet another object of the invention to provide a cart that can, in its entirety, withstand the heat and pressure of standard industry autoclaves.

One aspect of the invention relates to a storage/supports means, such as a stationary platform, for a supply transport device, such as a cart, that can be used to store or support such a device either inside of or outside of a clean room when not in use.

Accordingly, a stationary platform for supporting a supply transport device is provided. The stationary platform includes a frame having at least two longitudinal sides, a first end and a second opposing end, and a top surface and a bottom surface, and a plurality of legs extending from the bottom surface of the frame to support the supply transport device on the frame. The supply transport device is slidably received on the top surface of the frame.

The invention further provides a storage and transport system which includes a supply transport device, a stationary platform, and a wheel base assembly. The stationary platform includes a frame having at least two longitudinal sides, a first end and a second opposing end, and a top surface and a bottom surface, and a plurality of legs extending from the bottom surface of the frame to support the supply transport device on the frame. The supply transport device is slidably received on the top surface of the frame. The wheel base assembly includes a platform and a plurality of wheels attached thereto and is configured to transport a supply transport device to the stationary platform. The supply transport device is slidably removed from the wheel base assembly to the stationary platform for temporary holding or storage.

The invention is also directed to a wheel base assembly for transporting a supply transport device. The wheel base assembly includes a wheel base having a top surface, a bottom surface, and two opposing ends, wherein the top surface of the wheel base assembly supports the supply transport device, a plurality of wheels coupled to the bottom surface of the wheel base, a trough-shaped base coupled to at least one of the two opposing ends of the wheel base, and at least one cleaning device positioned within the trough-shaped base, wherein the at least one cleaning device extends vertically above the top surface of the wheel base.

These and other objects of the invention, as well as many of the intended advantages thereof, will become more readily apparent when reference is made to the following description, taken in conjunction with the accompanying drawings.

BRIEF DESCRIPTION OF THE FIGURES

A more complete appreciation of the invention and many of the attendant advantages thereof will be readily obtained as the same becomes better understood by reference to the following detailed description when considered in connection with the accompanying drawings, wherein:

FIG. 14B is an expanded perspective view of the wheel base assembly of FIG. 14A having a cleaning device attached thereto;

FIG. 15A is a perspective view of the cleaning device illustrated in FIG. 14A; and FIG. 15B is an expanded perspective view of the cleaning device of FIG. 15A.

DETAILED DESCRIPTION OF PREFERRED EMBODIMENTS

Figure 1:
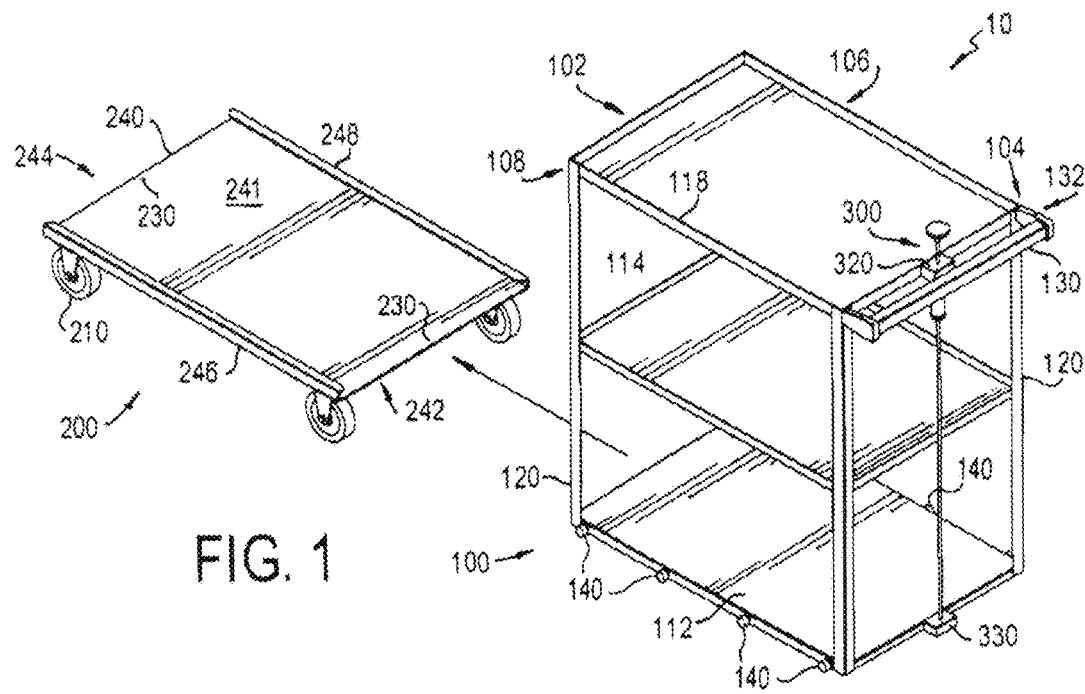
FIG. 1 shows a perspective view of the cart frame with its wheel base removed, in accordance with an embodiment of the invention.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents that operate in similar manner to accomplish a similar purpose. Several preferred embodiments of the invention are described for illustrative purposes, it being understood that the invention may be embodied in other forms not specifically shown in the drawings.

Figures 2A, 2B:
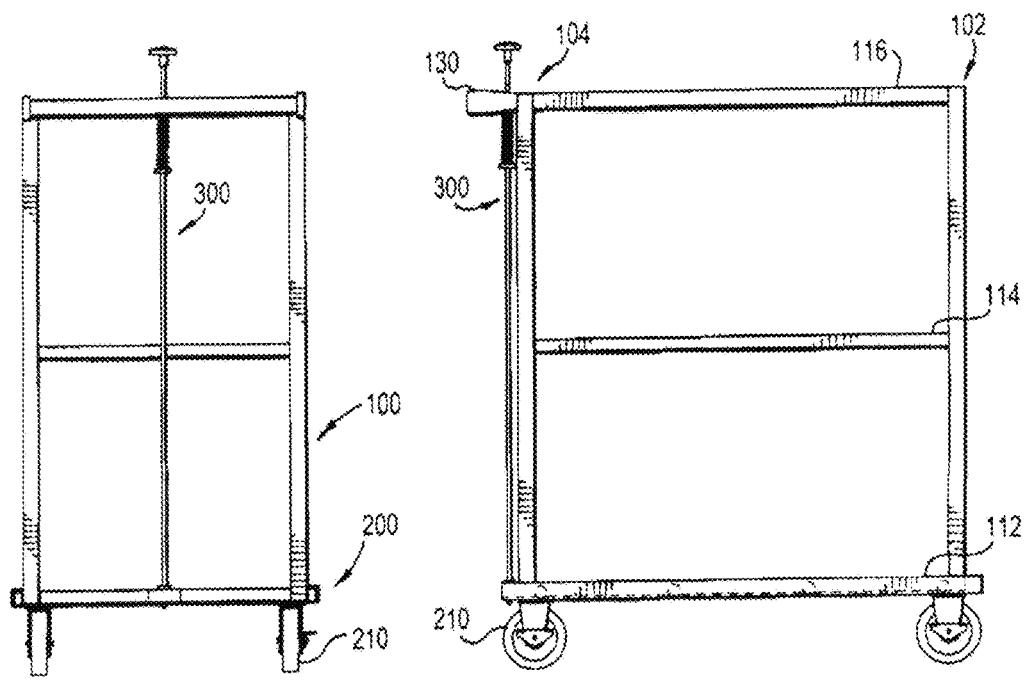
FIG. 2A is a front plan view of the cart with a removable wheel base attached.
FIG. 2B is a side plan view of the cart with a removable wheel base attached.
Figure 2C:
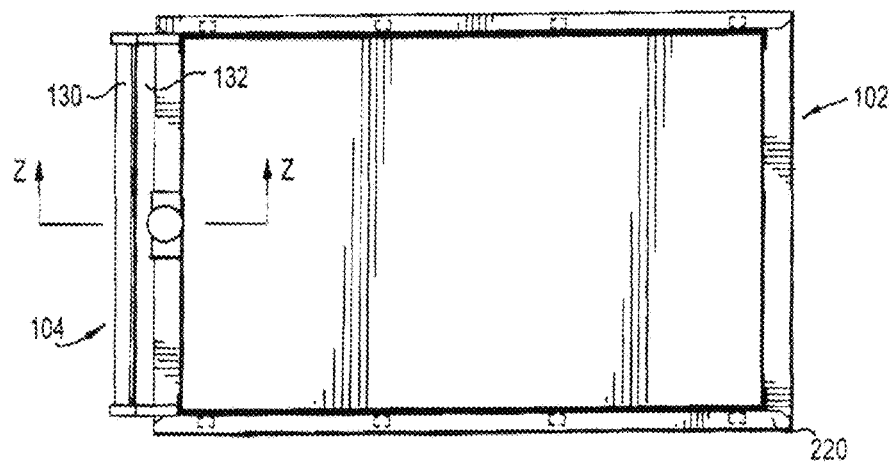
FIG. 2C is a top view of the cart with a removable wheel base attached.

FIGS. 1 and 2 show a transport device such as a cart 10 of the invention in accordance with a non-limiting illustrative embodiment. The cart 10 generally includes a main body or frame 100, a wheel base assembly 200, and a locking mechanism 300 for releasably locking the main body 100 to the wheel base assembly 200. The cart 10 is generally shown as having an elongated, rectangular shape. The entire cart 10, including the frame 100, the wheel base 200, and the locking mechanism 300, are made of a material that can withstand the moisture, heat, and pressure necessary for the entire cart 10 to be able to be autoclaved. Such materials may include, but are not limited to, metals and metal alloys such as nickel, aluminum or stainless steel, resilient plastics such as polypropylene, and Pyrex type glass.

Main Frame 100

As shown, the main frame or body 100 is a rectangular, unitary piece that defines a front transverse side or end 102, a rear transverse side or end 104 and two longitudinal sides 106, 108. The main body 100 has one or more horizontally-extending shelves that are each connected to and supported by four vertical support posts 120. Three shelves are provided in the embodiment shown, including a bottom shelf 112, center shelf 114 and top shelf 116. Each of the shelves 112, 114, 116 carries various items, such as goods and/or equipment. However, it is understood that in this and alternative embodiments of the invention may have a variable number of shelves and support posts 120, though preferably at least one bottom shelf 112 is provided. Each of the shelves 112, 114, 116 can have downwardly-turned edges that form side walls 118, which provide further support for the shelves 112, 114, 116. The shelves 112, 114, 116 can also have upward turned sides that prevent the items being transported from sliding off the shelves.

The main body 100 also includes an elongated handle 130. The handle 130 can be a round elongated tube that ends the entire width of the cart 10. The handle 130 is connected at the rear end 104 of the cart 10 by supports at the two outer sides 106, 108. The handle 130 is spaced apart from the rear end 104 and parallel to the rear end 104 to form a gap 132 between the handle 130 and the rear end 104 of the cart 10. The handle 130 can be substantially at the top of the cart 10 and level with or raised up from (by the supports) the top shelf 116.

Figure 3:
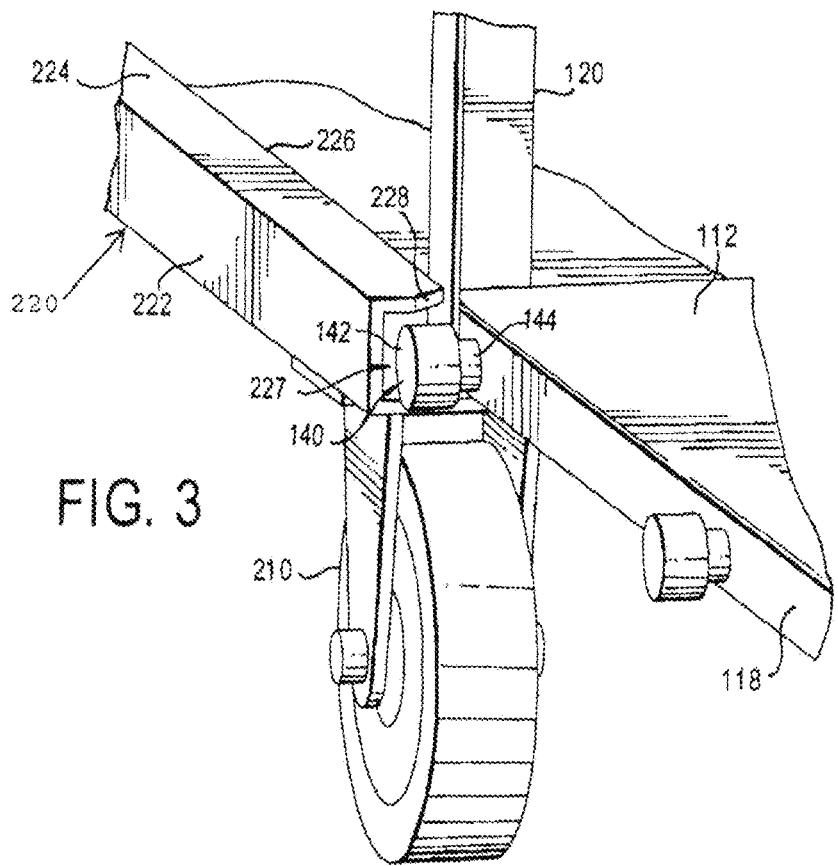
FIG. 3 is an enlarged perspective view of the wheel base wheel assembly of FIG. 1.

Guide wheel assemblies 140 are positioned along the downwardly-turned side walls 118 of the bottom shelf 112. As shown in FIG. 1, four guide wheel assemblies 140 are positioned along the longitudinal side walls 118, spaced apart from each other. Referring to FIG. 3, the wheel assemblies have a wheel 142 and an axle 144. The axle 144 can be a rod that extends through an opening in the side wall 118 and is fastened to the side wall 118 on the opposite side of the wall 118, such as by a bolt or the like. Or, the axle 144 can extend the entire width of the cart 10 so that one axle 144 has two wheels 142 fixed at opposite sides 118 of the cart 10. The guide wheel 142 is relatively wide, and is rotatably fixed to the axle 144 so that the guide wheel 142 rotates freely about the axle 144. The guide wheels 142 extend slightly below the side walls 118, so that they support the weight of the main body 100 when slidably received on the wheel base assembly 200. The wheels 142 rotate in a direction that is parallel to the longitudinal axis of the main body 100, i.e., forward/backwards. Thus, the guide wheels 142 rotate when the main body 100 is slidably received and removed from the wheel base assembly 200. The axis of rotation for each of the rolling-wheels 142 is perpendicular to the side wall 118 and to the axle 144. Though four guide wheel assemblies 140 are shown, any suitable number of guide wheel assemblies can be utilized, including one or more.

Wheel Base Assembly 200

As further shown in FIGS. 1-2, the wheel base assembly 200 includes wheel assemblies 210, two parallel, longitudinal guiderails 220, a lock opening 230 located at both ends of the wheel base 200, and a platform 240. The wheel assemblies 210 include a wheel frame and wheel rotatably coupled with the wheel frame. The wheel frame is connected to the bottom of the platform 240, such that a wheel assembly 210 is provided at each of the four corners of the cart 10 so that the cart 10 can be easily pushed and pulled by the user. At least one of the wheel assemblies 210 has a wheel lock mechanism 250 (FIG. 4A) that prevents movement of the cart 10. In one embodiment, one or more of the wheel assemblies 210 are swivel mounted so that each of the wheel assemblies 210 can rotate three hundred and sixty degrees (360°) about its longitudinal axis so that the cart 10 can be pushed or pulled in any direction.

The platform 240 is sized and shaped to cooperatively receive and mate with the main body 100. Accordingly, the platform 240 is a flat, rectangular, elongated, thin sheet having a traverse rear end 242, a transverse front end 244 and two longitudinal sides 246, 248. The platform 240 has a flat top surface 241 that is a single continuous sheet. However, the platform 240 can be comprised of one or more elongated slats that extend the full length of the wheel base assembly 200 from the front end 244 to the rear end 242. The platform 240 and wheel base assembly 200 are relatively low to the ground (3-8 inches, depending on the size of the wheels) to provide a stable base upon which the main body 100 can be fixed. Accordingly, the wheel base assembly 200 does not contain any unnecessary elements that might increase its height. So, the wheel base assembly 200 essentially has the wheels and the platform 240, with the wheels attached to the bottom side or surface of the platform 240.

Guiderails 220 are provided at each of the longitudinal sides 246, 248 of the wheel base assembly 200, and are elongated members that extend the entire length of the wheel base assembly 200. The guiderails 220 are best shown in FIG. 3. Each guiderail 220 has an upright portion 222, inwardly turned member 224, and an inner guide edge 226. The upright portion 222 extends perpendicularly upward from the flat top surface 241 and forms the outer edge of the guiderails 220 as well as the outermost edge of the longitudinal sides 246, 248. The inwardly turned member 224 extends perpendicularly inwardly with respect to the wheel base assembly 200 so that the inwardly turned member 224 is substantially parallel to and spaced apart from the top surface 241 of the platform 240. The top surface 241, upright portion 222 and inwardly turned portion 224 are metal (such as steel) walls that form a general U-shape turned on its side. A channel 227 is formed between the inwardly turned member 224 and the top surface 241 of the platform.

As shown, the upright portion 222 spaces the inwardly turned portion 224 apart from the top surface 241 of the platform 240 so that the guide edge 226 is aligned of the top of the rolling-wheel guide assemblies 140 that are attached to the side wall 118 of the main body 100. The guide wheels 142 slide along the guiderails 220 (longitudinally) as the wheels 142 rotate. The rolling-wheel guides 140 support, transport, and guide the main body 100 to slide along the platform 240, and allow the wheel base assembly 200 to slide beneath the main body 100. The rolling-wheel guides 140 allow the main body 100 to slidably engage the wheel base assembly 200 in a longitudinal direction. It will be appreciated, however, that the main body 100 and wheel base assembly 200 can be configured so that the main body 100 slidably engages the wheel base assembly in a side-to-side fashion in a transverse direction.

The guide wheel assemblies 140 prevent the main body 100 from coming free of the wheel base assembly 200 during use, and to guide the main body 100 when slidably received or removed from a wheel base assembly 200. As shown in FIG. 3, the wheels 142 extend downward slightly below the bottom of the side wall 118. Accordingly, the wheels 142 slide on the top surface 242 of the wheel base assembly 200. The wheels 142 are further received in the channel 227 formed between the top inwardly-turned portion 224 and the top surface 242 of the platform 240. The top member 224 forms a ledge that prevents the wheels 142 from coming free. The top member 224 retains the wheels 142 in the channel 227 and the wheels 142 can only slide forward and backward on the top surface 242 of the platform. Thus, the main body 100 cannot come free of the wheel base assembly 200 by being lifted upward with respect to the wheel base assembly 200, such as if the cart 10 were to tip or be lifted by the users. Rather, the main body 100 can only be separated from the wheel base assembly 200 by unlocking the lock mechanism 300 and sliding the main body 100 forward or backward so that the wheels 142 come out of the ends of the channels 227.

It is noted that the guiderails 200 need not be aligned with the downwardly-turned sides 118, but instead can just cooperatively engage the vertical posts 120 of the main body 100. The guiderails 220 can be formed, for instance, by bending the sides 246, 248 of the platform 240, so that the guiderails are integral with the platform 240. The front and rear corners 228 of the guiderails 220 are beveled to guide the main body 100 inwardly to between the inner edges 226 of the two guiderails 220 as the main body 100 initially slides onto the wheel base assembly 200. In addition, the wheels 142 need not support the weight of the main body 100, but rather can be positioned above the bottom edge of the side walls 118. In this manner, the side walls 118 would slide on the top surface 242 of the platform 240 and the wheels 142 would guide the main body 100 and prevent the main body 100 from separating from the wheel base assembly 200.

Figure 4A:
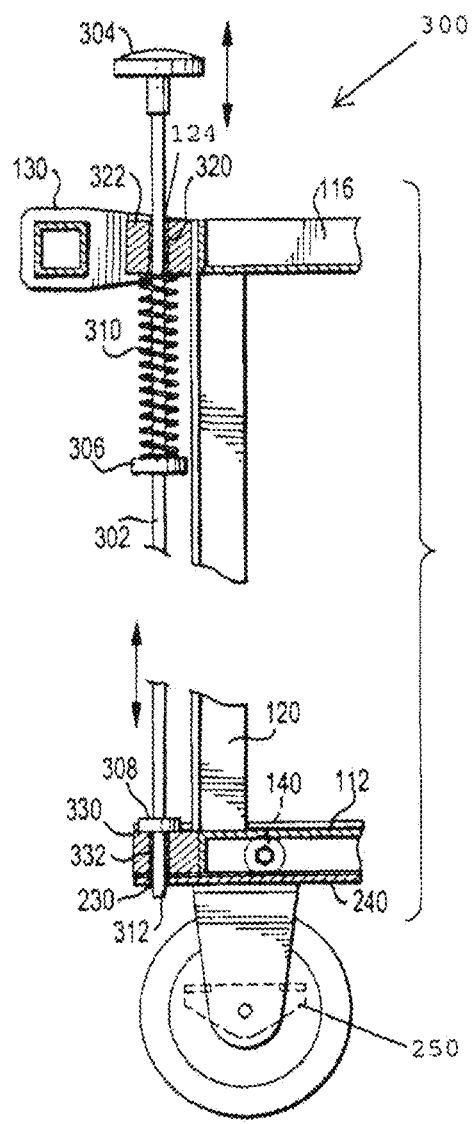
FIG. 4A is a side view of the top rear corner portion of the cart and the rear wheel base locking mechanism, taken along line Z-Z of FIG. 2C, with the locking mechanism in the locked position.
Figure 4B:
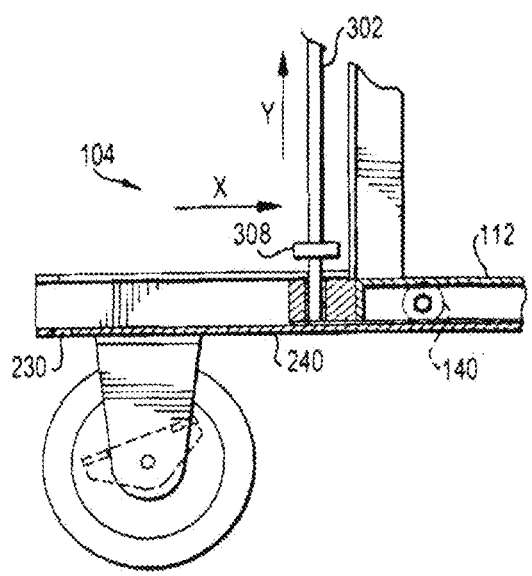
FIG. 4B is a side view of the rear wheel base wheel assembly of FIG. 4A, with the locking mechanism in the unlocked position.

Referring now to FIGS. 4A, 4B, further detail of the locking mechanism 300 is shown. The locking mechanism 300 includes a vertical rod 302, a release knob 304, an upper stop 306, a lower stop 308, a spring 310, and an upper guide hole 124. The vertical rod 302 extends the entire height of the main body 100. A handle such as a knob 304 is positioned at a proximal end of the rod 302. The vertical rod 302 is coupled with the main body 100 of the cart 10 at the rear end 104 of the cart 10. The rod 302 is slidably fastened to the main body 100 by an upper support member 320 and a lower support member 330. The upper support member 320 is fixedly attached at the top portion of the main body 100. In the embodiment shown, the upper support member 320 is fastened to the upper shelf 116 (such as the side wall 118 of the upper shelf 116) and can also be fastened to the inside of the handle 130. The upper support member 320 can be positioned in the gap 132 between the handle 130 and the top shelf 116. The lower support member 330 is fixedly attached at the bottom portion of the main body 100. In the embodiment shown, the lower support member 330 is fastened to the lower shelf 112, such as the side wall 118 of the lower shelf 112.

The upper support member 320 has a central opening or upper through-hole 322 and the lower support member 330 has a central opening or lower through-hole 332. The upper and lower through-holes 322, 332 are slightly larger than the diameter of the rod 302 so that the rod 302 snugly fits in the holes 322, 332. Accordingly, the rod 302 is received in the upper and lower through-holes 322, 332. The holes 332, 332 are large enough so that the rod 302 can freely slide up and down within the holes 322, 332, but not too large to allow the rod 302 to wiggle.

The upper stop member 306 is provided about a top portion of the rod 302 and is fixedly attached to rod 302. The upper stop member 306 is positioned below the upper support member 320 a sufficient distance to permit the spring 310 to be provided between the upper stop member 306 and the upper support member 320. Accordingly, the spring 310 is positioned about the rod 302 between the bottom surface of the upper support member 320 and the top surface of the upper stop member 306. The spring 310 has a diameter that is greater than the diameter of the upper hole 322, but smaller than the width of the upper support member 320. The diameter of the spring 310 is also smaller than the diameter of the upper stop member 306. The spring 310 is slightly compressed so it pushes outwardly against the bottom surface of the upper support member 320 and the top surface of the upper stop member 306.

Thus, the upper stop 306 is fixed to the rod 302 and the rod 302 slides within the upper support member 320, which is fixedly attached to the main body 100. The outwardly-biased spring 310 pushes the rod 302 downwardly (by virtue of pushing downward on upper stop member 306 which is fixed to rod 302) so that a distal end portion 312 of the rod 302 is forced downward to engage into the lock opening 230 of the wheel base assembly 200, as shown in FIG. 4A. The lower stop member 308 is fixedly coupled to the rod 302 at the bottom portion of the rod 302, and prevents the rod 302 from extending too far downward within the openings 332, 230 and hitting the ground or otherwise interfering with operation of the cart 10.

When the rod 302 is received in the lock opening 230 of the wheel base assembly 200, the cart 10 is in a locked position, whereby the wheel base assembly 200 is locked to the main body 100. In the locked position, the main body 100 remains fixed to the wheel base assembly 200 by the cooperative engagement of the locking mechanism 300 in the lock opening 230, as well as by the bottom portion (the bottom shelf 112 and/or support posts 120) being positioned between the guiderail members 220. Accordingly the wheel base assembly 200 will move together with the main body 100 as the user pushes/pulls the cart handle 130.

The proximal end of the rod 302 and the knob 304 extend up above the top surface of the top shelf 116 and the cart handle 130. The knob 304 is located so that the operator of the cart 100 is able to easily reach and operate the wheel base locking mechanism 300 while still gripping the handle 130.

The user can lift up on the knob 304 in the direction Y against the bias of the spring 310, as shown in FIG. 4B. This action causes the distal end portion 312 of the rod 302 to withdraw from the locking hole 230 of the wheel base assembly 200. In this position, the cart 10 is in an unlocked state or position, whereby the wheel base assembly 200 is no longer locked to the main body 100. The guiderails 220 still prevent the main body 100 from move transversely or laterally with respect to the wheel base assembly 200. However, the main body 100 can slide in a longitudinal direction X (FIGS. 1, 4B). More specifically, the bottom surface of the bottom shelf 112 slides along the top surface 241 of the platform 240. Because both surfaces are smooth metal, the main body 100 can slide without too much difficulty, even when items are loaded on the shelves 112, 114, 116. Thus, although element 112 is referred to as a shelf, it is a flat and sturdy plate that is sufficiently rigid to permit the main body 100 to slide on the platform 240. The platform 240 is also a flat and sturdy plate that is sufficiently rigid to allow the main body 100 to slide on its top surface 241.

The rod 302 cannot be pulled up high enough such that the distal end portion 312 comes out of the opening 332 in the lower support member 330. The rod 302 is prevented from moving upward when the spring 310 is fully compressed between the upper stop member 306 and the upper support member 320. In addition, the lower support member 330 can be made taller, or an additional stop member can optionally be provided on the rod 302 (such as at the distal end 312) to limit the upward movement of the rod 302. Still further, another support member with a through-hole that receives the rod 302 can be affixed to the main body 100 (such as the middle shelf 114) to prevent upward movement of the lower stop member 208 or another stop member (not shown).

Operation of Cart 10

Figure 5A:
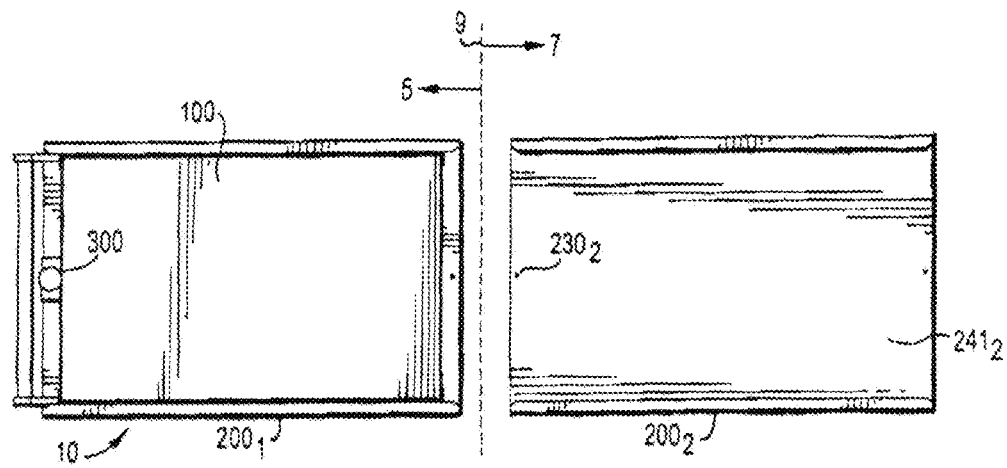
FIG. 5A is a top view as a cart in an uncontrolled environment approaches a wheel base assembly positioned in a controlled environment.
Figure 5B:
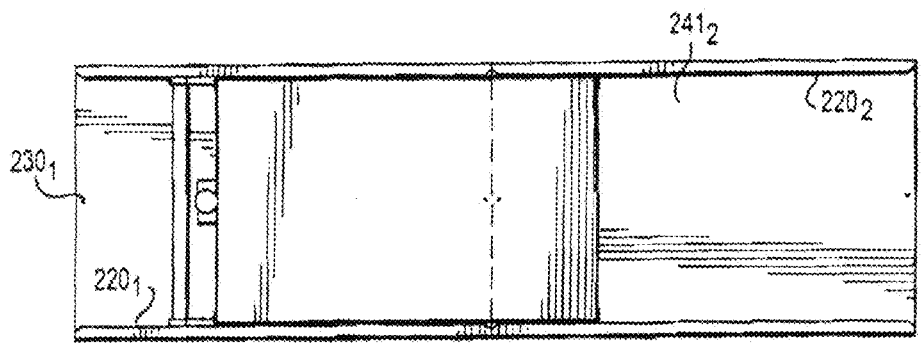
FIG. 5B is a top view as a cart moves between an uncontrolled environment and a controlled environment, replacing its non-sterile wheel base with a sterile wheel base.
Figure 5C:
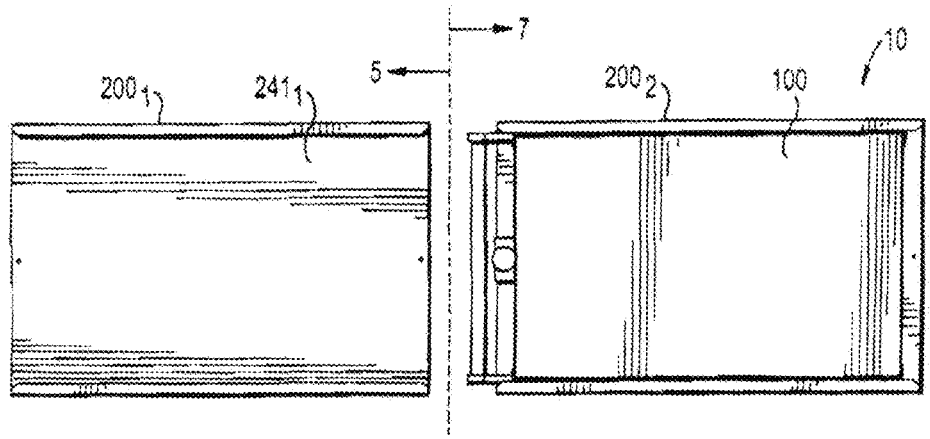
FIG. 5C is a top view of a cart completely within a controlled environment, after having replaced its non-sterile wheel base with a sterile wheel base.

Turning to FIGS. 5A, 5B, 5C, operation of the cart 10 is shown. In this non-limiting illustrative example, the cart 10 is moved from an uncontrolled environment 5 (e.g., outside a clean room) to a controlled environment 7 (e.g., inside a clean room) by a single operator. The border or boundary 9 is shown separating the controlled environment 7 and uncontrolled environment 5. The boundary 9 can be, for instance, the entrance to an airlock located outside a clean room. Or, the boundary 9 can be inside the airlock and outside the entrance to the clean room. Or, the boundary 9 can be between two clean rooms having different particulate levels. For instance, the cart 10 can be moving from an ISO 14644-1 class clean room to an ISO 14644-2 class clean room. Items (such as goods, product and/or equipment) can be carried on the shelves 110 of the cart 10. These items may be sterile and exposed or sealed inside sealed packaging such as bags. FIGS. 5A-5C illustrate an operator transporting those items into a clean room or other controlled environment without contamination to the items or to the controlled environment.

Starting with FIG. 5A, the cart 10 is located in the uncontrolled environment 5 and is brought to the boundary 9. The cart 10 includes both a main body 100 and a first wheel base assembly $200_1$, as shown in the fully assembled embodiments of FIGS. 2A-2C. At the same time, a second wheel base assembly $200_2$ is located on the other side of the boundary 9, inside the controlled environment 7. Accordingly, there are two wheel base assemblies 200: a first assembly $200_1$ that is attached to the main body 100 in the uncontrolled environment 5, and a second assembly $200_2$ that is by itself in the controlled environment 7. The wheels 210 on the second wheel base assembly $200_2$ are in the locked position, so that the second wheel base assembly $200_2$ cannot move.

At this point, the operator pushes the cart 10 using the handle 130 up to the boundary line 9, so that the first wheel base assembly $200_1$ comes into contact with the second wheel base assembly $200_2$. The user then locks the wheels 210 of the first wheel base assembly $200_1$ so that the first wheel base assembly $200_1$ cannot move. The first and second wheel base assemblies $200_1$, $200_2$ are identical, so their respective platforms $240_1$, $240_2$ are the same height as one another. The user aligns the first wheel base assembly $200_1$ with the second wheel base assembly $200_2$ so that the sides 246, 248 substantially align with each other. A guide member can optionally be provided on the front end 244 of the first wheel base assembly $200_1$ and/or the rear end 242 of the second wheel base assembly to (individually or jointly) assist the user in aligning the first wheel base assembly $200_1$ with the second wheel base assembly $200_2$.

Accordingly, the first wheel base assembly $200_1$ is aligned with the second wheel base assembly $200_2$, and the main body 100 (together with any items it is carrying) is ready to be moved from the first wheel base assembly $200_1$ to the second wheel base assembly $200_2$. Accordingly, the user lifts up on the knob 304 of the locking mechanism 300 (FIG. 4A) against the force of the spring 310, which withdraws the distal end portion 312 from the first lock opening $230_1$, thereby unlocking the main body 100 from the first wheel base assembly $200_1$. The extent to which the operator may lift the knob 304 is limited by the upper stop 306, which compresses the spring 310 to its mechanical limit between the upper stop 306 and the surface of the upper support member 320 surrounding the upper guide hole 322.

In the unlocked position, the user can push on the handle 230 so that the main body 100 slides along the top surface $241_1$ of the platform 240 of the first wheel base assembly $200_1$ and onto the top surface $241_2$ of the platform 240 of the second wheel base assembly $200_2$, as shown in FIG. 5B. As the main body 100 is slid onto the second wheel base assembly $200_2$, the first and second guiderails $220_1$, $220_2$ guide the main body 100 in the longitudinal direction X (FIG. 4B). The support posts 120 may come into contact with the beveled corners 228 of the second guiderail $220_2$, and the beveled corners 228 direct the main body 100 to come within the second guiderails $220_2$. Once the main body 100 is pushed slightly off the first wheel base assembly $100_1$, the rod 302 is no longer aligned with the lock opening 230, so the user can release the knob 304. The distal end 312 will be pushed back down by the force of the spring 310, and will ride along the top surfaces $241_1$, $241_2$ of the respective platforms 240. A catch can be optionally provided to hold the knob in the upright position so that the user need not hold it.

The user continues to push on the handle 130 until the main body 100 is fully positioned on the second wheel base assembly $200_2$ inside the controlled environment 7. Because the wheels on the second wheel base assembly $200_2$ are locked, the wheel base assembly $200_2$ remains stationary and does not move as the main body is being slid onto it. Here, it is noted that although both the first and second wheel bases $200_1$, $200_2$ are locked, only the second wheel base $200_2$ needs to be locked. However, the first wheel base $200_1$ can also be locked to further prevent motion of the first wheel base $200_1$ during the transfer operation. And, the first wheel base $200_1$ will then be locked and ready to accept the main body 100 again when the user exits the controlled environment 7. Once the main body 100 is fully received on the second wheel base assembly $200_2$, the rod 302 will be aligned (by the inner edges 226 of the guiderails $220_2$) with the lock opening $230_2$ and will automatically enter the lock opening $230_2$ under the outward (downward) force of the spring 210.

At that point, the main body 100 is locked to the second wheel base assembly $200_2$ (with the sterile wheels) inside the controlled environment 7, and the first wheel base assembly $200_1$ (with the unsterile wheels) remains in the uncontrolled environment 5. As shown in FIG. 5C, the wheels of the second wheel base assembly $200_2$ can then be unlocked by the user, and the cart 10 (with the main body 100 and the second wheel base assembly $200_2$) can be maneuvered inside the clean room 7 so that the items can be delivered to the appropriate location inside the clean room 7. It is noted that during the transfer operation of FIGS. 5A-5C, the items remain on the shelves 112, 114, 116 of the cart 10 and need not be removed. In addition, the main body 100 never touches the ground, but instead moves directly from the first platform surface $240_1$ to the second platform surface $240_2$.

The process described can also be executed identically in reverse, i.e., when the cart 10 travels from the controlled environment 7 to the uncontrolled environment 5. At all times, however, the sterile and non-sterile wheel bases remain sequestered in their respective environments, preventing any cross-contamination of particulate matter while the cart 10 moves between these environments. The wheel bases are substantially identical so that they are exchangeable with one another and the frame 100 can be readily moved from one wheel base assembly to another without having to reconfigure the main body 100. In addition, openings 230 are located at both the front and rear ends 244, 242 of the wheel base assemblies 200, so that the main body 100 can be placed on the wheel base assembly 200 from either direction.

Thus, the cart 10 enables items to be carried on the shelves 112, 114, 116. Those items remain on the shelves 112, 114, 116 as the cart 10 is moved between an uncontrolled environment and a controlled environment. In this way, a user need not manually remove the items from the cart to bring the items into the clean room, while leaving the cart outside of the clean room. And, the wheels that are used in the uncontrolled environment do not enter the controlled environment. Rather, the wheels used in the controlled environment remain inside the controlled environment and do not leave the controlled environment. Accordingly, the cart wheels are not introducing particles into the controlled environment.

As discussed and shown above, a single locking mechanism 300 is provided that is mostly located on the main body 100 and only an opening 230 is needed on the wheel base assembly 200. However, any suitable number and configurations can be provided. For instance, multiple locking mechanisms can be provided, located at one or more sides 106, 108 or ends 102, 104 of the main body frame 100. And, the locking mechanism can include a fastener or mating locking mechanism on the wheel base assembly that cooperatively engages a locking mechanism on the main body 100. Still further, the locking mechanism 300 need not have a long rod 302, but can have a short rod with the knob just above the bottom shelf 112 so that the user must bend down to lift the knob.

In addition, the invention is shown as having a bottom shelf 112 that slides on the top surface 241 of the platform 240, so that any items on the shelf 112 are moved onto the new wheel base assembly. However, other variations can be provided. As mentioned above, the platform 240 can be slats or the like. And, instead of a bottom shelf 112, the posts 120 can have wheels. Or, elongated longitudinal supports can be provided with roller bearings that engage mating roller bearings on the wheel base assembly (such that guiderails are not needed).

Another feature of the invention is that the entire cart 10 is made of materials that can be autoclaved. Thus, the entire cart 10 and any items it carries, can be placed in an autoclave and sterilized. Still further variations of the cart 10 can be provided within the spirit and scope of the invention. Although the invention is described as having a wheel base assembly 200 that is completely separate from the main body 100, other embodiments of the invention can be provided within the invention. For instance, the main body 100 can have multiple sets of interchangeable wheels, so that one set of wheels is used in the clean environment and one set of wheels is used outside the clean environment. The wheels can be separately removable so that each wheel is replaced one at a time, or the two front wheels and two rear wheels can each be coupled together so that the front wheels can be replaced at one time and the rear wheels can be replaced at one time. Or the wheels can remain fixed to the main body and operated by a lever to raise one set of wheels and lower the other set of wheels. For instance, a wheel assembly can have two wheels each fixed to a pivot plate that pivots between one of the wheels being lower and the other wheel raised.

Storage/Transport Cart or Rack 600, 700

Figure 6A:
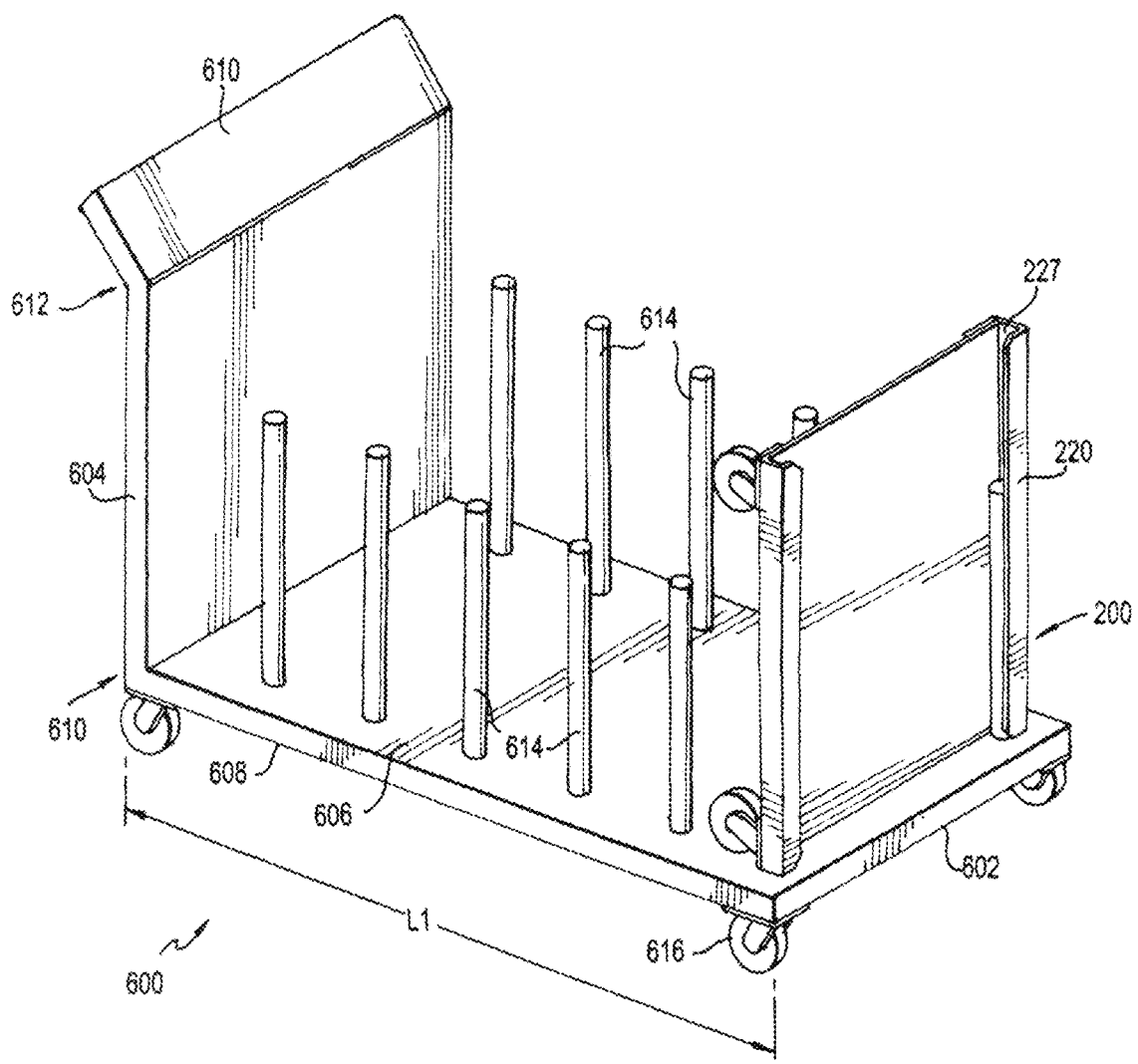
FIG. 6A is a side perspective view of a rack used to transport the wheel base assemblies of FIG. 1, in accordance with an embodiment of the invention.
Figure 6B:
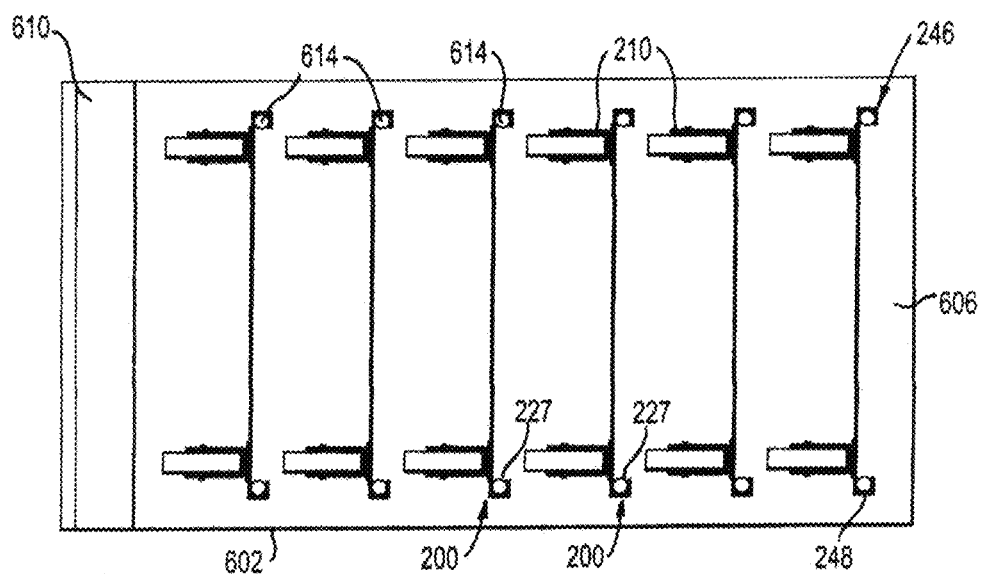
FIG. 6B is a top view of the rack of FIG. 6A.
Figure 6C:
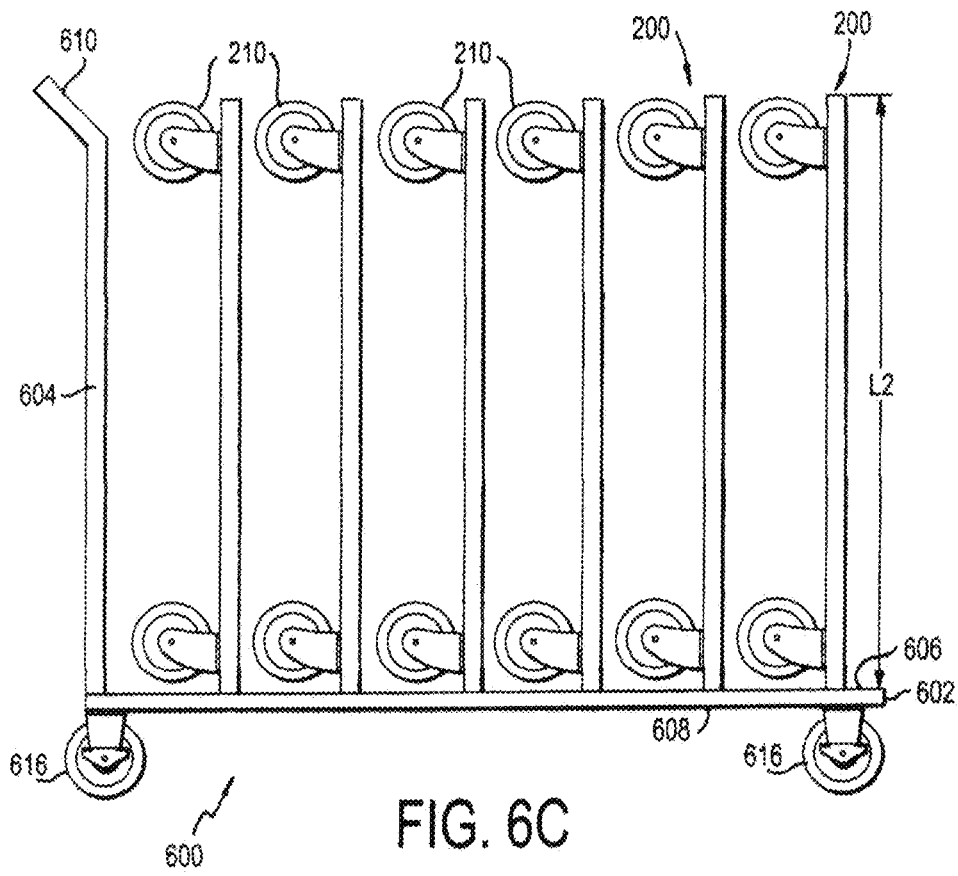
FIG. 6C is a side view of the rack of FIG. 6A.

Another feature of the invention is illustrated in FIGS. 6A-6C. As shown in FIG. 6A, the invention includes a wheel base transport cart or rack 600 that may be used to store and/or transport one or more wheel base assemblies 200 to and retain in an autoclave. The rack 600 is generally formed of a bottom portion 602 and at least one handle assembly 604. The bottom portion 602 may be formed of a flat, rectangular, elongated, plate that has an upper surface 606 and a bottom surface 608. The bottom portion 602 of the rack 600 is sized and configured to accommodate multiple wheel base assemblies 200 and to allow it to fit within an autoclave. The handle assembly 604 may be formed of poles or rods 612 and a handle 610. The poles 612 may extend perpendicularly (as shown in FIG. 6A) or at an angle from the upper surface 606 of an end 610 of the bottom portion 602. The poles 612 and the handle 610 are formed integrally with or attached to each other. As shown in FIG. 6C, the handle 610 is formed integrally with the poles 612 and extends at an angle from the top of the poles 612. The handle 610 allows a user to push the rack 600.

According to one embodiment, the bottom portion 602 and handle assembly 604 (including handle 610 and poles 612) are formed of material which may be autoclaved, including, but not limited to, metals and metal alloys such as nickel, aluminum, or stainless steel, resilient plastics such as polypropylene, and Pyrex®-type glass (i.e., low-thermal-expansion borosilicate glass). Thus, the entire rack 600 (and any wheel base assemblies 200 being held by the rack 600) may be autoclaved.

As shown in FIG. 6A, the rack 600 includes a plurality of poles or posts 614 extending upwardly from the upper surface 606 of the bottom portion 602 of the rack 600. The posts may be formed integrally with the bottom portion 602 of the rack 600, or they may be coupled to the upper surface 606 of the bottom portion 602 by pins, screws, or the like. The posts 614 may have a circular cross-sectional shape or may have any other cross-sectional shape that allows them to securely hold the wheel base assemblies 200 and fit within the channels 227 of the guiderails 220, such as a square, oval or octagonal cross-sectional shape. In one embodiment, the posts 614 are configured in pairs along a length ($L_1$) of the bottom portion 602 of the rack 600 with each pair in a row that extends transverse across the rack 600. Each post 614 of the pair is spaced apart from the other post 614 such that a first post 614 of a pair engages a channel 227 of the guiderail 220 of the wheel base assembly 200 on one longitudinal side 246, while the other of the posts 614 of the pair engages the channel 227 of the guiderail 200 on the other longitudinal side 248 of the wheel base assembly 200. The posts 614 have a height that is sufficient to securely hold the wheel base assemblies 200 in place, such as at least half the length ($L_2$) of the wheel base assembly 200.

While FIG. 6A depicts a total of twelve posts 614 to accommodate six wheel base assemblies 200, the invention is not particularly limited to any number of posts 614. The rack 600 is designed to allow for the autoclaving of multiple wheel base assemblies 200 at a time, so a plurality of posts 614 is preferred. Like the bottom portion 602 and handle assembly 604 of the rack 600, the posts 614 are also formed of materials which may be autoclaved, such as those discussed herein.

The posts 614 are configured to hold each of the wheel base assemblies 200 in a vertical position on the rack 600. As shown in FIGS. 6A and 6B, the posts 614 are positioned within the channels 227 of the longitudinal guiderails 220 of either longitudinal side 246, 248 of the wheel base assembly 200, such that the flat top surface 241 (see FIG. 1) of the wheel base assembly 200 is oriented perpendicularly to the bottom portion 602 of the rack 600. The posts 614 have a cross-sectional size and shape that allows them to fit within the channels 227 snugly, so as to secure the wheel base assemblies 200 in place, without having to force the wheel base assemblies 200 down into the posts 614. The wheel base assemblies 200 should be secure enough that they may be moved around on the rack 600 without tipping or falling off. As shown in FIG. 3, each guiderail 200 is formed of an inwardly turned member 224 that engages the post 614 and prevents the wheel base assembly 200 from moving forward or backward on the rack 600, and an upright portion 222 that engages the post 614 and prevents the wheel base assembly 200 from moving side-to-side on the rack 600. In this way, the wheel base assemblies 200 are prevented from moving forward or backward or side-to-side on the rack 600 so that they do not come free.

The wheel base assemblies 200 are arranged vertically on the rack 600 so that the rack 600 may accommodate multiple wheel base assemblies 200 (as shown in FIG. 6C) without requiring a rack 600 that is too large to be easily moveable by the user or to fit within an autoclave. The wheel base assemblies 200 are positioned on the rack 600 parallel to one another in a stacked relationship. In operation, the user will slide each of the wheel base assemblies 200 down onto the rack 600 by aligning the openings of the channels 227 of the guiderails 220 on each longitudinal side 246, 248 with two adjacent posts 614. The posts 614 may be guided down into the channels 227 by the beveled front and rear corners 228 (see FIG. 3) of the guiderails 220. The top of the posts 614 can also be rounded or tapered to further guide the wheel base assembly 200 onto the posts 614. As shown in FIG. 6C, the wheels 210 of the wheel base assembly 200 may face the handle assembly 604 of the rack, but they may also be oriented to face in the opposite direction.

The rack 600 may include a plurality of wheels 616 coupled to the bottom surface 608 of the bottom portion 602, so that the rack 600 may be physically moved from one location to another, such as from an outside environment into an autoclave or clean room environment. The wheels 616 may be positioned at each corner of the bottom surface 602 of the bottom portion 602 to ensure stability of the rack 600.

In this way, the rack 600 is sized and configured to store, hold and transport multiple wheel base assemblies 200, so as to efficiently autoclave multiple wheel base assemblies 200 simultaneously. However, the rack 600 may also be sized and configured to transport other devices for simultaneously autoclaving.

Figure 7B:
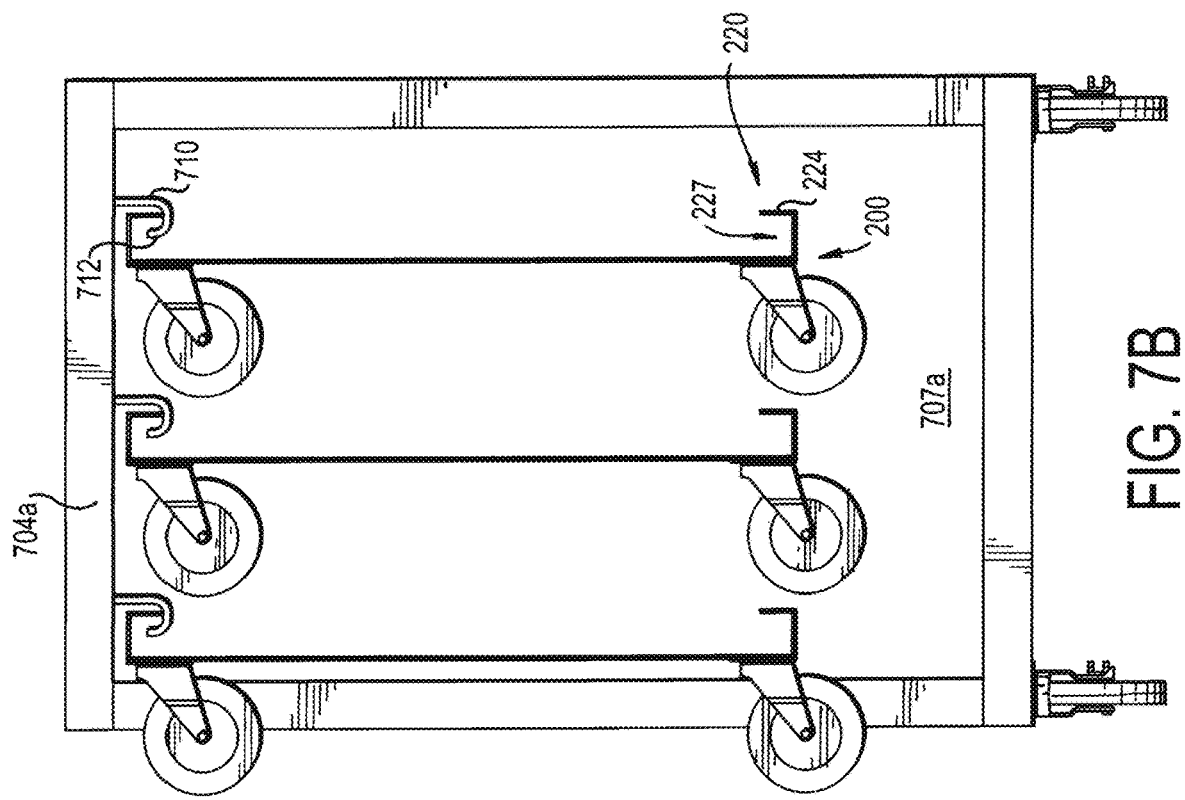
FIG. 7B is a front view of the rack of FIG. 7A.
Figure 7A:
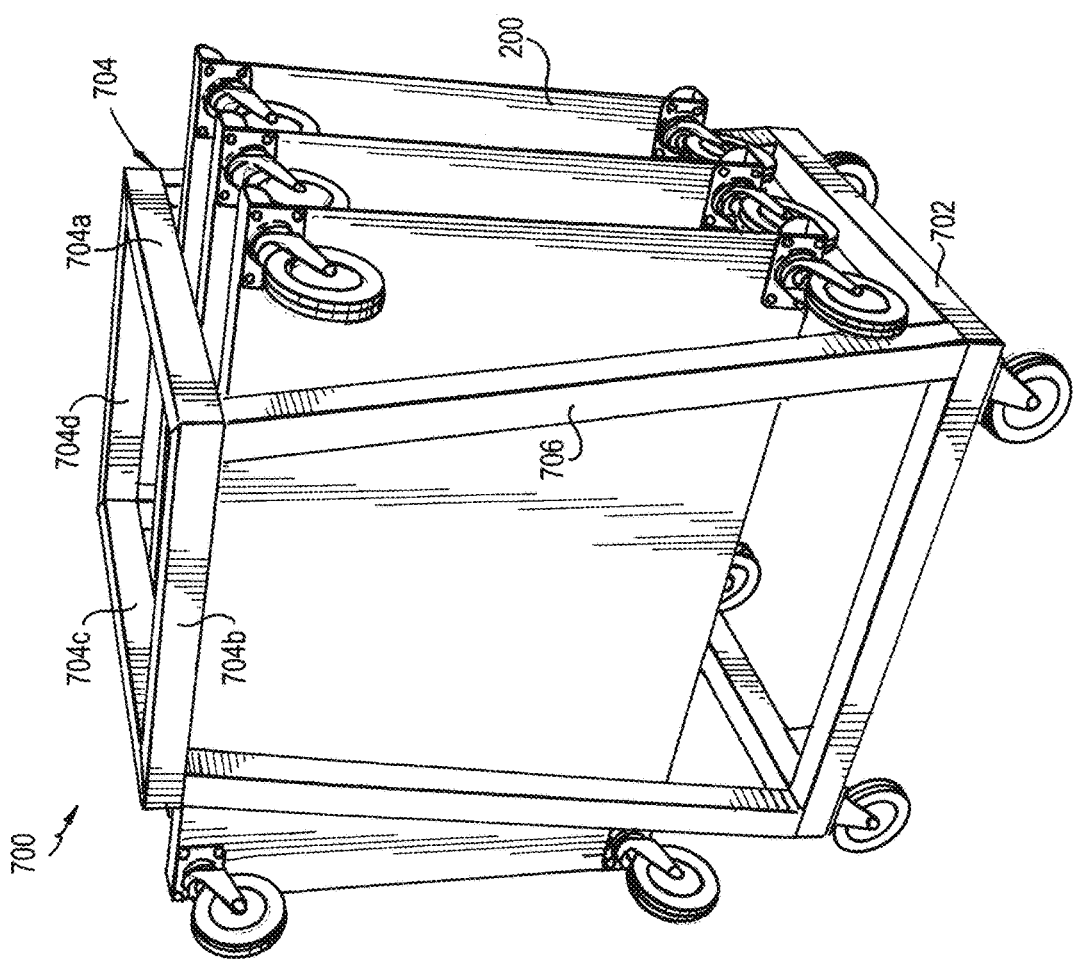
FIG. 7A is a perspective view of the rack in accordance with an alternative embodiment of the invention.
Figure 7C:
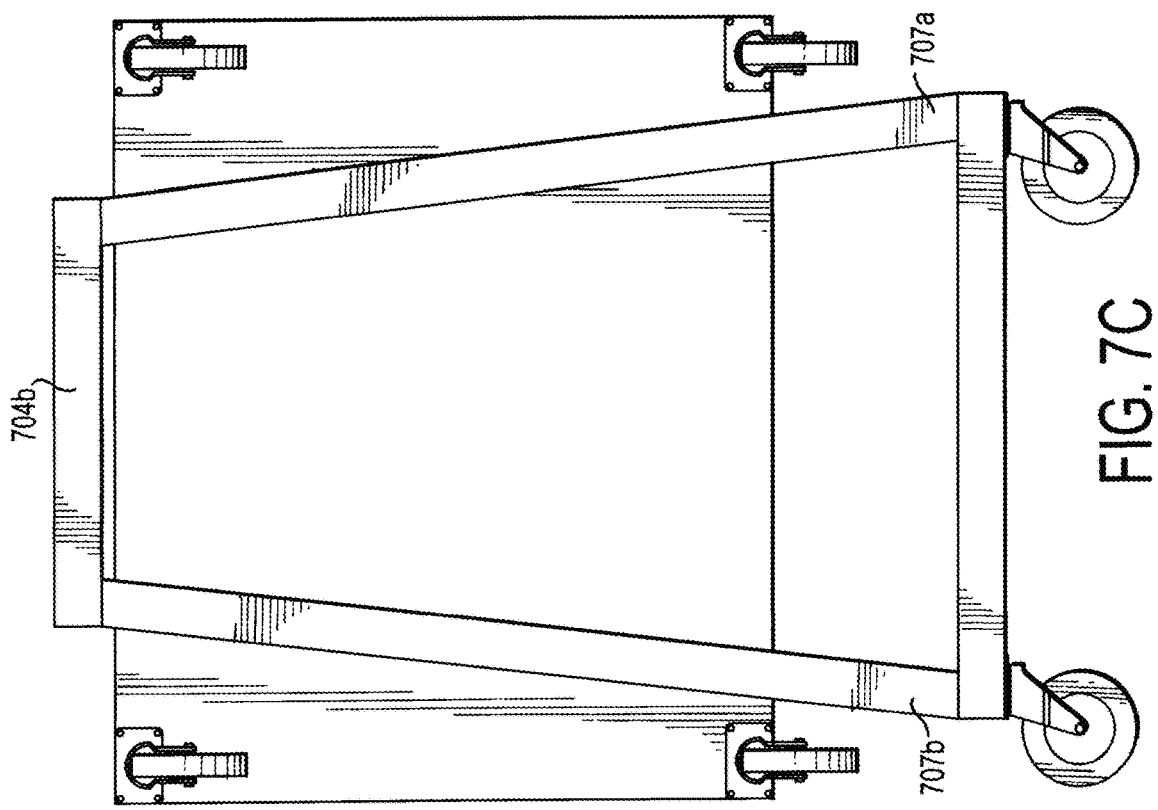
FIG. 7C is a side view of the rack of FIG. 7A.

Turning to FIGS. 7A-7C, a rack 700 is shown in accordance with an alternative embodiment of the invention. The cart or rack 700 may be used to store and/or transport one or more wheel base assemblies 200 to and retain in an autoclave. The rack 700 is sized and configured to accommodate multiple wheel base assemblies 200 and to allow it to fit within an autoclave. According to one embodiment, the entire rack 700 are formed of material which may be autoclaved, including, but not limited to, metals and metal alloys such as nickel, aluminum, or stainless steel, resilient plastics such as polypropylene, and Pyrex®-type glass (i.e., low-thermal-expansion borosilicate glass). Thus, the entire rack 700 can be autoclaved, together with any wheel base assemblies 200 being held by the rack 700.

The rack 700 has a frame with a base frame portion 702, top frame portion 704, and four side support poles 706. The bottom and top frame portions 702, 704 can each be formed by four elongated support members that are connected together in a square shape having an open center. Thus, the top frame portion 704 has a front support member 704a, rear support member 704c, and side support members 704b, 704d. Alternatively, the bottom and/or top frame portions 702, 704 can be solid plates.

As best shown in FIG. 7C, the top frame portion 704 can be smaller than the bottom frame portion 702, and the side support poles 706 can extend substantially vertically upward and angled inward slightly to connect each corner of the bottom frame portion 702 to the respective corner of the top frame portion 704. The wider base frame portion 702 provides greater stability, and the smaller top frame portion 704 allows for easier insertion and removal of the wheel base assemblies 200. The support poles 706 forms an internal space having a front opening 707a and a rear opening 707b.

As shown in FIG. 7B, one or more hooks 710 are provided. The hooks 710 are coupled to the bottom of the top frame portion 704. In one embodiment, a plurality of hooks 710 are coupled to the front and rear support members 704a, c, and are spaced from one another so that a wheel base assembly 200 can fit between the neighboring hooks 710. Each hook 710 on the front support member 704a are aligned with a respective hook 710 on the rear support member 704c, to form a respective pair. The hooks 710 can have a general J-shape so they extend downward from the supports 704a, 704c, then curve back upward and form an upwardly turned lip 712. The hooks 710 extend substantially parallel to a central longitudinal axis of the front and rear supports 704a, 704c.

In this manner, one or more wheel base assemblies 200 can be releasable engaged with the cart 700 by hanging each wheel base assembly on a respective pair of hooks 710. More specifically, the hooks 710 can releasably engage one of the guiderails 220 of the wheel base assembly 200, so that the assembly 200 hangs vertically sideways. The hooks 710 hook onto the inwardly turned top member 224 so that the inner guide edge 226 rests on the hook 710. When the wheel base assembly 200 is positioned on the hooks 710, the hook lip 712 extends upward into the guide channel 227, so that the wheel base assembly 200 cannot be removed without the user lifting the wheel base assembly upward to come over the lip 712.

Thus, the rack 700 holds multiple wheel base assemblies 200 at one time, with the wheel base assemblies 200 extending substantially parallel to one another, and perpendicularly on the rack relative to the bottom frame portion. As shown in FIG. 7B, the wheel base assemblies 200 are between the two sides of the rack 700. As shown in FIG. 7C, the wheel base assemblies 200 extend outward beyond the front and rear of the cart 700 so that the assemblies 200 can be grasped by a user and easily hanged and removed from the hooks 710. In operation, the user grabs an assembly 200 about the guiderail 220 and can insert his fingers into the channel 227. The user then inserts the assembly 200 in through the front or rear opening 707a, b of the rack between the respective front or rear support poles 706, then lifts the assembly 200 over the lip 712 and lets the assembly down onto the hook 710. The process is reversed to remove the assembly 200 from the rack 700.

The rack 700 may include a plurality of wheels 716 coupled to the bottom surface of the bottom frame portion 702, so that the rack 700 may be physically moved from one location to another, such as from an outside environment into an autoclave or clean room environment. The wheels 716 may be positioned at each corner of the bottom frame portion 702 to ensure stability of the rack 700. The user can pull and/or push the rack 700 by grabbing one of the support members 704a, b, c, d.

In this way, the rack 700 is sized and configured to store, hold and transport multiple wheel base assemblies 200, so as to efficiently autoclave multiple wheel base assemblies 200 simultaneously. However, the rack 700 may also be sized and configured to transport other devices for simultaneously autoclaving.

Supply Transport/Storage Cart 800

Figure 8:
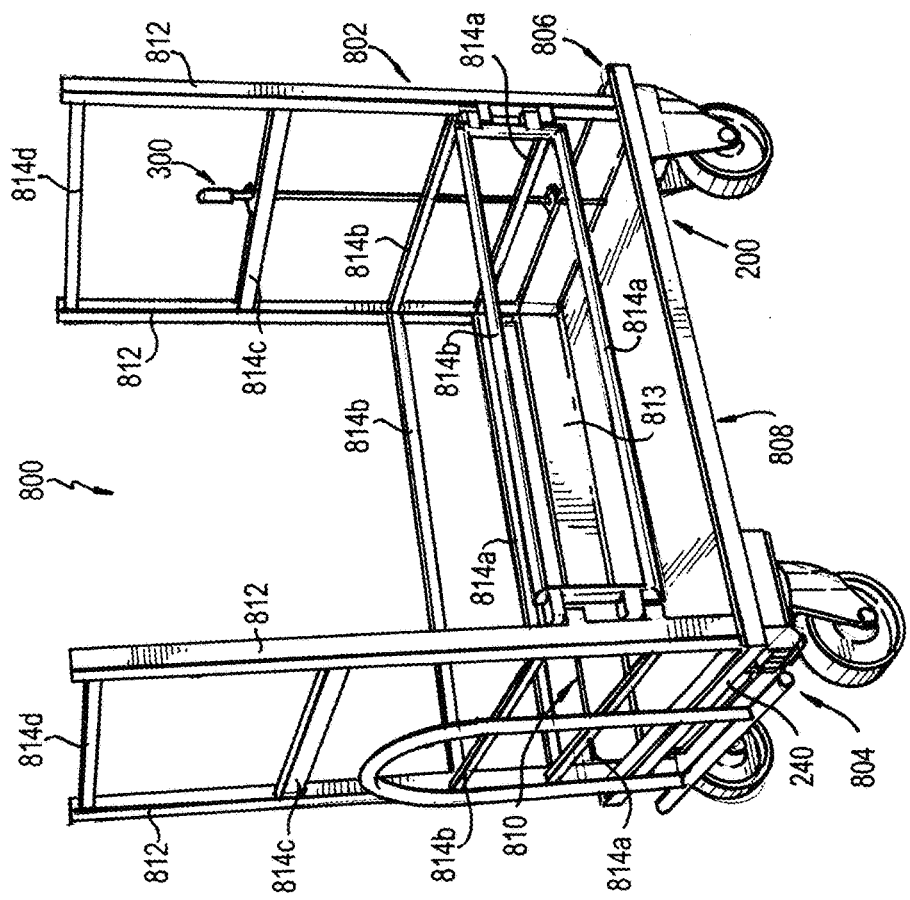
FIG. 8 is a front perspective view of a supply cart in accordance with an alternative embodiment of the invention.

Another feature of the invention is illustrated in FIG. 8. In this embodiment, a supply transport/storage cart 800 (the "supply cart 800") may be used to transport and store cans, bottles, or other bulky or uniquely-shaped supplies to and from a clean room environment. The supply cart 800 may utilize the wheel base assembly 200 set forth herein to allow it to be moved from one location to another, but the body of the supply cart 800 is different than those embodiments illustrated in FIGS. 1 and 2A-C.

The main body 802 of the supply cart 800 is a rectangular, unitary piece that defines a front transverse side or end 804, a rear transverse side or end 806 and two opposing longitudinal sides 808, 810 so as to form a frame. The body 802 has four corner vertical support posts 812 that extend upwards from the wheel base assembly 200, although any number of support posts 812 may be used. In one embodiment, the vertical support posts 812 extend upwards from a bottom surface 813 of the body 802. The bottom surface 813 may be a substantially flat surface that extends between each of the vertical support posts 812. In yet a different embodiment, the body 802 may have no bottom surface 813, such that it is simply formed as a frame having the vertical support posts 812 connected by horizontal cross members, as discussed below.

In one embodiment, the main body 802 further includes guide wheel assemblies (not shown) at a base of the main body 802, such as guide wheel assemblies 140, that allow the main body 802 to be slidably received and removed from the wheel base assembly 200. In an embodiment where the body 802 includes the bottom surface 813, the guide wheel assemblies may be aligned along an outer edge (not shown) of the bottom surface 813. In an embodiment where the body 802 includes no bottom surface 813, the guide wheel assemblies may be coupled to bottom cross bars (not shown) that extends between the vertical support posts 812 from the front end 804 to the rear end 806.

The supply cart 800 may be received on and removed from the wheel base assembly 200 in the same manner as cart 10 and as illustrated in FIGS. 5A-C. In this embodiment, the body 802 is sized and shaped to cooperatively receive and mate with the wheel base assembly 200 via the mechanisms set forth herein with respect to cart 10, including the locking mechanism 300 which releasably locks the body 802 to the wheel base assembly 200. If the body 802 includes the bottom surface 813, the bottom surface 813 is slidably received on the top surface 241 of the platform 240 of the wheel base assembly 200. Otherwise, the bottom cross bars may be sturdy enough that they slide over the top surface 241 of the platform 200 of the wheel base assembly 200 and support the supply cart 800 thereon.

In an alternative embodiment, the body 802 of the supply cart 800 is formed integrally with the wheel base assembly 200.

The main body 802 further includes a plurality of horizontal cross members 814 that extend between each of the vertical support posts 812 at different heights so as to form side rails. As illustrated in FIG. 8, the body 802 has a total of twelve horizontal cross members 814, although any number of horizontal cross members 814 may be used for a particular application. In this embodiment, four horizontal cross members 814a extend between the four vertical support posts 812 to form a rectangular shape directly above the wheel base assembly 200. Another four horizontal cross members 814b extend between the four vertical support posts 812 to form another rectangular shape directly above the four horizontal cross members 814a. In this way, cans, bottles, or other supplies may be placed on the bottom surface 813 of the body 802 of the supply cart 800 and are held in place by the horizontal cross members 814a, 814b so that they do not fall off the supply cart 800.

In one embodiment, as illustrated in FIG. 8, the horizontal cross members 814a, 814b form a hinged door (not shown) at the rear end 806 of the supply cart 800. In another embodiment, the hinged door may be formed at the front end 804 or either side 808, 810.

Four additional horizontal cross members 814c, 814d extend between two of the vertical support posts 812, such that cross members 814d are directly above cross members 814c. In this way, taller cans, bottles, and other supplies may be held in place on the wheel base assembly 200 without falling off the front transverse end 804 and rear transverse end 806 of the supply cart 800. In one embodiment, cans, for example, can be tied to cross members 814c, 814d, to keep them in place. A handle similar to handle 130 may be used to allow the user to push the supply cart 800. In another embodiment, the user may push the supply cart 800 by handle 1026, discussed more fully below with respect to FIG. 10B. In yet another embodiment, the user may push or pull the supply cart 800 using horizontal cross members 814c, 814d.

The supply cart 800 is preferably formed of a material that can withstand the moisture, heat, and pressure necessary for the entire supply cart 800 to be able to be autoclaved. Such materials include, but are not limited to, metals and metal alloys such as nickel, aluminum, or stainless steel, resilient plastics such as polypropylene, and Pyrex type glass.

Tray Transport/Storage Cart 900

Figure 9:
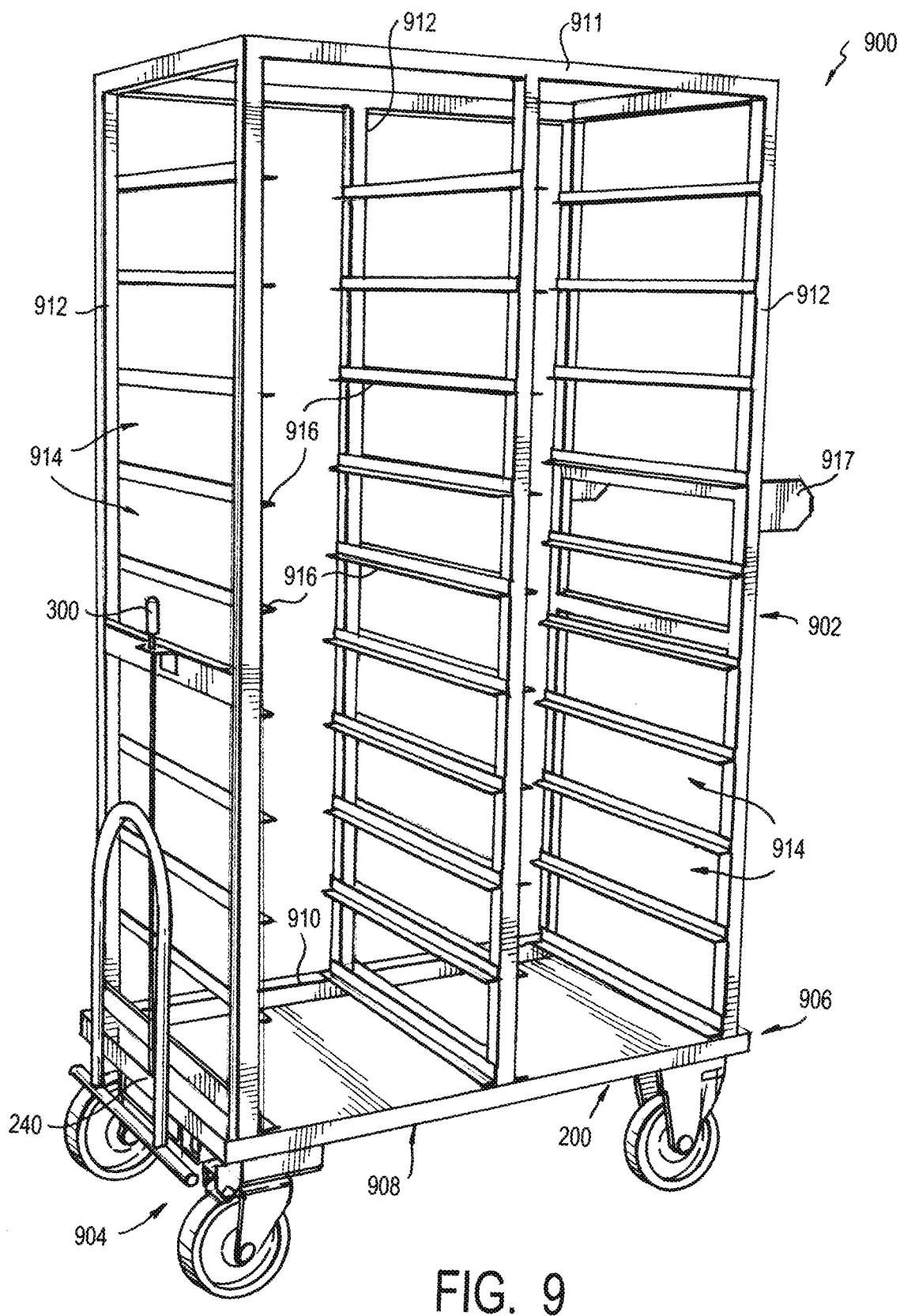
FIG. 9 is a front perspective view of a tray cart in accordance with an alternative embodiment of the invention.

Another feature of the invention is illustrated in FIG. 9. In this embodiment, a tray transport/storage cart 900 (the "tray cart 900") may be used to transport flat trays to and from a clean room environment or store flat trays inside or outside of a clean room. The tray cart 900 may utilize the wheel base assembly 200 set forth herein to allow it to be moved from one location to another, but the body of the tray cart 900 is different than those embodiments illustrated in FIGS. 1, 2A-C and 8.

The main body 902 of the tray cart 900 is a rectangular, unitary piece that defines a front transverse side or end 904, a rear transverse side or end 906 and two opposing longitudinal sides 908, 910 so as to form a frame. In one embodiment, the main body 902 includes cross members that extend along the base of the longitudinal sides 908, 910. Each of these cross members may include guide wheel assemblies (not shown), such as guide wheel assemblies 140, that allow the main body 902 to be slidably received and removed from the wheel base assembly 200. In another embodiment, the main body 902 includes a bottom surface 913. The bottom surface 913 may be a substantially flat surface that extends from the front end 904 to the rear end 906 of the body 902.

The tray cart 900 may be received on and removed from the wheel base assembly 200 in the same manner as cart 10 and as illustrated in FIGS. 5A-C. In this embodiment, the body 902 is sized and shaped to cooperatively receive and mate with the wheel base assembly 200 via the mechanisms set forth herein with respect to cart 10, including the locking mechanism 300 which releasably locks the body 802 to the wheel base assembly 200. If the body 902 includes the bottom surface 913, the bottom surface 913 is slidably received on the top surface 241 of the platform 240 of the wheel base assembly 200. In an embodiment where the body 902 includes no bottom surface 913, the cross members may be sturdy enough that they slide over the top surface 241 of the platform 240 of the wheel base assembly 200 and support the tray cart 900 thereon.

In an alternative embodiment, the body 902 of the tray cart 900 is formed integrally with the wheel base assembly 200.

The body 902 is generally formed of at least one elongated tray-receiving structure 912 extending between each of the longitudinal sides 908, 910 and vertically upwards from the wheel base assembly 200. If the body 902 includes a bottom surface 913, each of the tray-receiving structures 912 extends vertically upwards from the bottom surface 913 and are joined thereto. In one embodiment, the main body 902 preferably includes at least three elongated tray-receiving structures 912. As illustrated in FIG. 9, each of the tray-receiving structures 912 has a rectangular shape. Each of the tray-receiving structures 912 may be joined by a rectangular top joining member 911, such that each of the tray-receiving structures 912 is secured together. If the body 902 includes the bottom surface 913, each of the tray-receiving structures 912 is secured together at the bottom surface 913 as well. If there is no bottom surface 913, each of the tray-receiving structures 912 may be further joined by a rectangular bottom joining member.

The tray-receiving structures 912 include a plurality of opposing perpendicularly-extending lips 916, which function as a tray support. Each opposing lip 916 is positioned at the same height along the height of the tray-receiving structure 912 such that the trays, when placed on each of the opposing ledges or lips 916, are positioned evenly and generally parallel to the ground. In this way, each set of opposing lips 916 creates a slot 914 for the tray to be placed. The trays may be kept in the slots 914 so that they can be stored or transported via the tray cart 900. As illustrated in FIG. 9, the opposing lips 916 are arranged such that they create a plurality of stacked slots 914. In one embodiment, each of the tray-receiving structures 912 has at least eight (8) slots 914, such that the entire tray cart 900 can hold at least 24 trays at one time, but any number of tray-receiving structures 912 and slots 914 may be used for a particular sized tray cart 900.

A handle similar to handle 130 may be used to allow the user to push the tray cart 900. In another embodiment, the user may push the tray cart 900 by handle 1026, discussed more fully below with respect to FIG. 10B. In yet another embodiment, the tray cart 900 may include a handle 917 at the rear end 906 (as illustrated in FIG. 9) or at end front end 904.

Similar to the supply cart 800, the tray cart 900 is preferably formed of a material that can withstand the moisture, heat, and pressure necessary for the entire supply cart 800 to be able to be autoclaved. Such materials include, but are not limited to, metals and metal alloys such as nickel, aluminum, or stainless steel, resilient plastics such as polypropylene, and Pyrex type glass.

Each of the supply cart 800 and tray cart 900 are examples of types of carts that may be used together with the wheel base assembly 200. The common feature between each of these designs is that each preferably includes a bottom surface (813, 913) that is slidably received on the top surface 241 of the platform 240 of the wheel base assembly 200. In this way, the wheel base assembly 200 can be used to transport a variety of different types of carts and the carts may be easily swapped out or exchanged for other types of carts. Additionally, other types of carts having other main body designs may also utilize the wheel base assembly 200 of the invention. It is further contemplated that other mechanisms for locking the carts to the wheel base assembly 200 may be utilized, including pins, screws, and other known coupling mechanisms.

Braking Mechanism

Figure 10A:
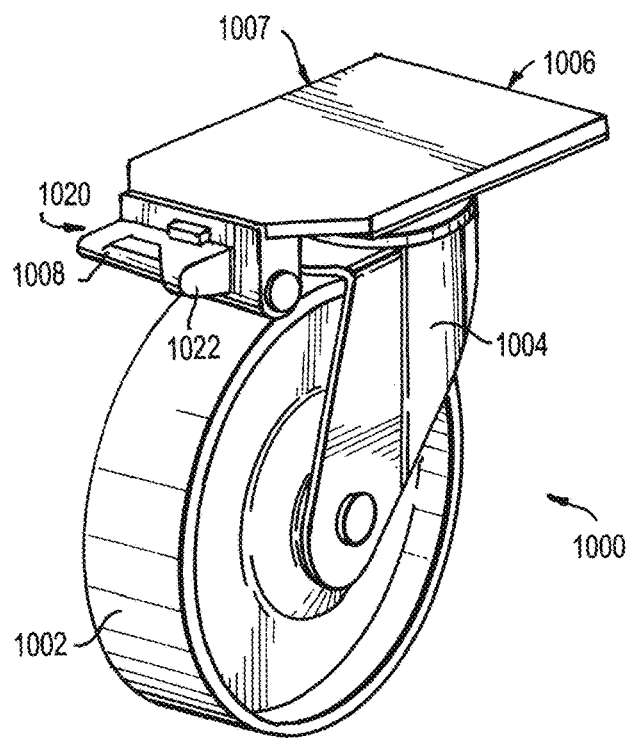
FIG. 10A is a front perspective view of a prior art braking mechanism.
Figure 10B:
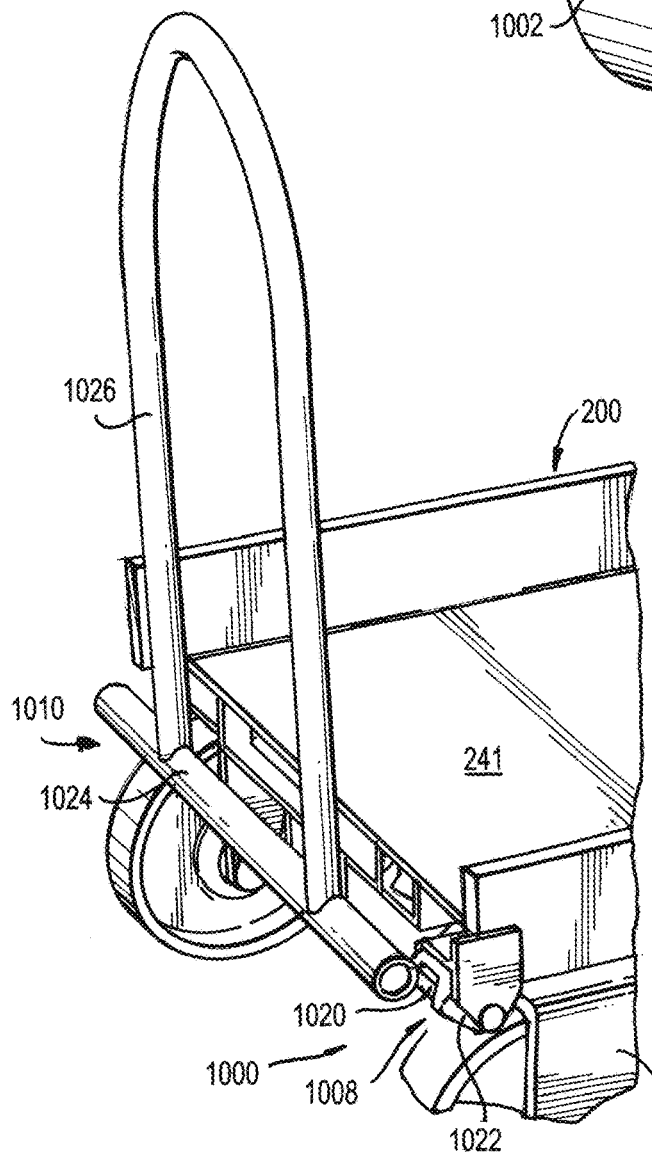
FIG. 10B is a cutaway front perspective view of an exemplary wheel base having the braking mechanism illustrated in FIG. 10A.

Another feature of the invention is illustrated in FIGS. 10A-B. A wheel and braking mechanism 1000 (the "braking mechanism 1000") may be incorporated together with the wheel base assembly 200 for use with any of the carts disclosed herein, including cart 10 (FIG. 1), supply cart 800 (FIG. 8) and tray cart 900 (FIG. 9), or with the wheel base transport cart or rack 600. In one embodiment, the braking mechanism 1000 may be used with other types of carts separate from the invention of FIGS. 1-9.

The braking mechanism 1000 may be formed integrally with the wheel base assembly 200 or wheel base transport rack 600, or it may be fitted to the wheel base assembly 200 or wheel base transport rack 600 after their manufacture. If the latter method is used, the braking mechanism 1000 may be coupled to the wheel base assembly 200 or wheel base transport rack 600 in the place of the wheel assemblies 210 or wheels 616, respectively. The embodiments disclosed in FIGS. 10A-B can be used together with or as an alternative to the wheel lock mechanism 250 of FIG. 4A.

As illustrated in FIG. 10A (prior art), the braking mechanism 1000 generally includes a wheel 1002, a swivel caster 1004, a platform 1006, and a stop brake 1008. The wheel 1002 is coupled to the swivel caster 1004, which in turn is coupled to a bottom surface of platform 1006, which in turn may be coupled to the wheel base assembly 200 or wheel base transport rack 600 via a top surface of the platform.

The stop brake 1008 is formed of an L-shaped body having a first end 1020 and a second opposing end 1022. When in an "open" position, the first end 1020 is parallel with the platform 1006, and the second end 1022 is perpendicular to the top surface 1007 of the platform 1006. When the stop brake 1008 is rotated into a "closed" position, the second end 1022 of the stop brake 1008 activates a stopping mechanism (not shown) that applies a force against the wheel 1002 so as to stop the wheel 1002 from being able to rotate, such as by frictional forces. As such, when in the closed position, the stop brake 1008 restricts or prohibits the wheel 1002 from rotating so as to lock it in place, and the wheel base assembly 200 or wheel base transport rack 600 is therefore stopped from any further movement. When the stop brake is rotated into its open position, the second end 1022 deactivates the stopping mechanism (not shown) to allow the wheel 1002 to freely rotate, thus allowing the wheel base assembly 200 or wheel base transport rack 600 to be moved again.

To control the operation of the stop brake 1008, a control or actuation mechanism 1010 is provided, as illustrated in the cutaway of FIG. 10B. In this Figure, the braking mechanism 1000 is illustrated for use with the wheel base assembly 200, but the braking mechanism 1000 may be used together with any wheel base assembly, cart, or rack disclosed herein, or any cart or transport device having a wheel assembly. The actuation mechanism 1010 generally includes a horizontal bar 1024 and an inverted, U-shaped handle 1026. In one embodiment, the horizontal bar 1024 has a generally circular cross-sectional shape. In other embodiments, the handle 1026 need not be U-shaped, but may take any shape that is able to be gripped by a user.

In this embodiment, the horizontal bar 1024 is positioned at an end (such as the traverse rear end 242 or transverse front end 244) of the wheel base assembly 200 and extends between each side (such as longitudinal sides 246, 248) of the wheel base assembly 200. The U-shaped handle 1026 extends from a surface of the horizontal bar 1024 vertically upwards, preferably to a comfortable height that allows a user to grab the handle 1026 to move the wheel base assembly 200, but not too high that it obstructs the user being able to pull/push the cart 10 by holding onto the body frame 100. The user can optionally grab the handle 1026 to pull/push the cart 10, though preferably grabs the body frame 100 and only uses the handle 1026 for braking. In one embodiment, the U-shaped handle 1026 is formed integrally with the horizontal bar 1024. In another embodiment, the handle 1026 is coupled to the horizontal bar 1024 using any known attachment methods, such as by welding or with bolts or screws.

The horizontal bar 1024 is coupled to the first end 1020 of the stop brake 1008, as illustrated in FIG. 10B. In one embodiment, the horizontal bar 1024 is welded to the first end 1020 of the stop brake 1008. The horizontal bar 1024 is linear and substantially parallel to the end of the rear end 242 of the wheel base assembly 200, and is set back from the rear end 242 so that rotation of the bar 1024 is unobstructed. In operation, when a user lowers the handle 1026 toward the floor, it causes the horizontal bar 1024 to rotate the stop brake 1008 between the open and closed positions discussed above. Thus, when the handle 1026 is lowered, the second end 1022 of the stop brake 1008 activates the stopping mechanism which applies a force against the wheel 1002 so as to stop the wheel 1002 from being able to rotate. When the handle 1026 is raised back up, the second end 1022 of the stop brake 1008 deactivates the stopping mechanism to allow the wheel 1002 to freely rotate again.

As set forth above, the braking mechanism 1000 may be used together with any of the carts or racks disclosed herein. In one embodiment, the already-existing wheels on a wheel base assembly 200, for example, may be replaced with the wheel and braking mechanism 1000. In addition, the braking mechanism 1000 can be used with any convention cart, such as a single-piece cart that does not have a separate wheel base assembly 200. Still in further embodiments of the invention, while the braking mechanism (including the handle 1026) is shown and described as being attached to the base 200, it can be instead attached to the frame 100.

With further reference to FIG. 8, the locking mechanism 300 is located at one end of the cart 10 and the handle 1026 is located at an opposite end of the cart 10. However, the locking mechanism 300 and handle 1026 can both be located at the same end as each other, or one or both of those can be located at any of the four sides of the cart.

Stationary Platform

Figure 11:
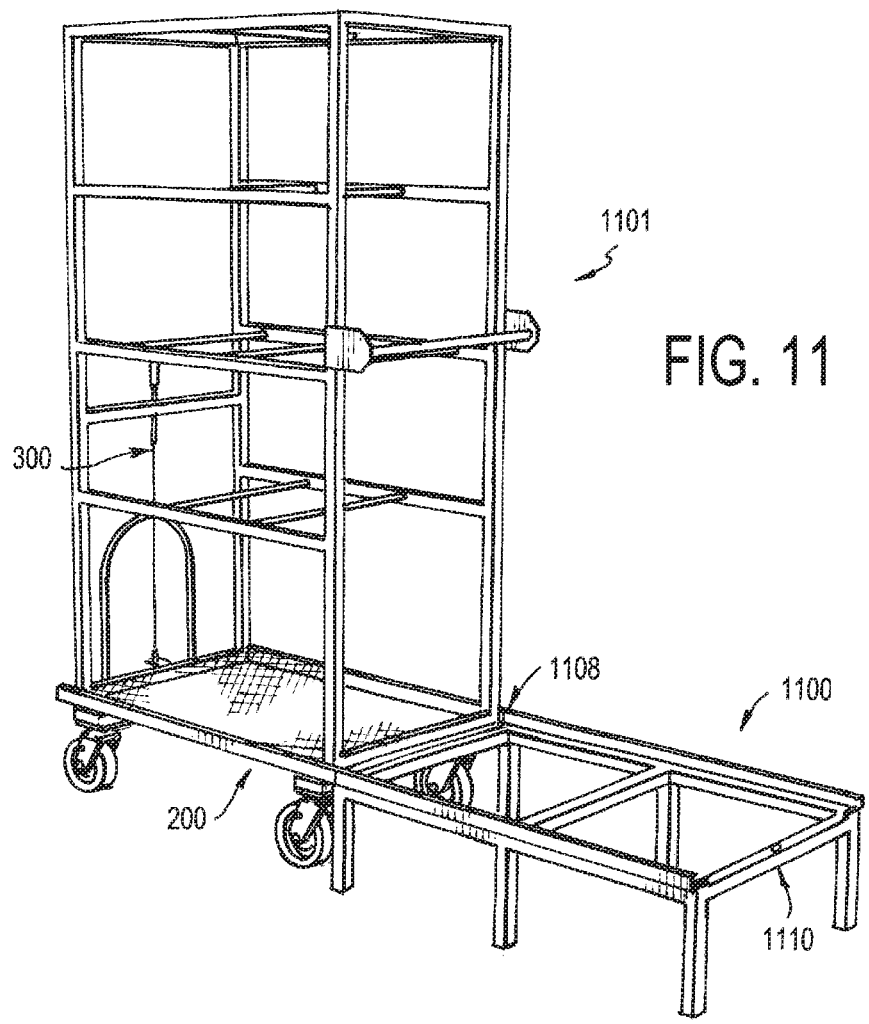
FIG. 11 is a perspective view of a stationary platform being used with a cart having a removable wheel base in accordance with an embodiment of the invention.

A stationary platform 1100 may be used in conjunction with a supply transport device, such as the main body 100 of cart 10, rack 600, rack 700, supply cart 800, and/or tray cart 900, and the wheel base assembly 200 disclosed herein. As illustrated in FIG. 11, a supply transport device 1101 similar to the main body 100 of cart 10 is used (hereinafter, the "transport device 1101"). In this embodiment, the transport device 1101 may be slidably removed from the wheel base assembly 200 onto the stationary platform 1100 for temporary holding or storage.

Figure 12:
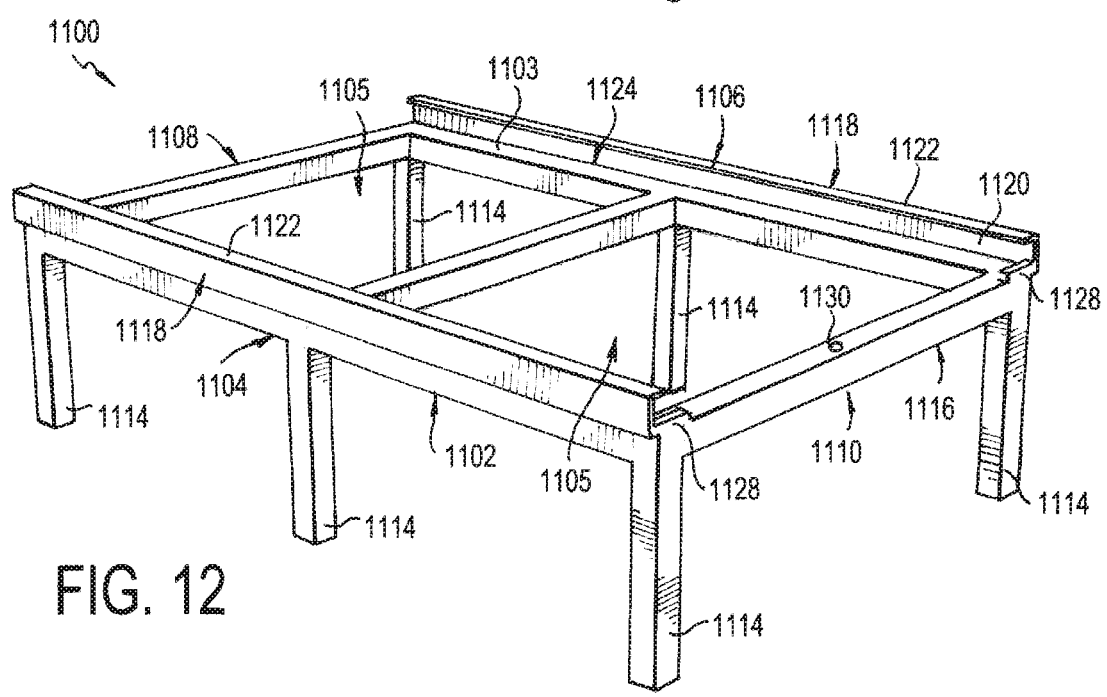
FIG. 12 is a perspective view of the stationary platform of FIG. 11.

Looking to FIG. 12, the stationary platform 1100 (hereinafter, the "platform 1100") has a generally rectangular shape, although any shape that is useful for a particular application or that corresponds to the shape of a particular cart may be used. The platform 1100 is formed of a frame 1102 having a top surface 1103 on which the transport device 1101 is placed. As set forth in FIG. 12, the frame 1102 has two longitudinal sides 1104 and 1106 and two opposing ends 1108 and 1110, although any number of sides may be used for a particular application. At least one cross member 1112 may be provided as part of the frame 1102 to provide additional support to the transport device 1101. The cross member 1112 is preferably a bar-shaped member that extends perpendicularly between each of the longitudinal sides 1104 and 1106. Although not illustrated, additional cross members may extend perpendicularly between each of the opposing ends 1108 and 1110 to provide additional support. The longitudinal sides 1104 and 1106, opposing ends 1108 and 1110, and cross member(s) 1112 thus form a rectangular structure having openings 1105 formed in the interior thereof. The openings 1105 provide more contact surface exposure of the transport device 1101 where the platform 1100 is used during a cleaning process, such as being placed inside an autoclaving device. In this way, when the transport device 1101 is positioned on the platform 1100 in the autoclaving device, more of its surface area is exposed to provide for better sterilization.

The frame 1102 is generally supported by a plurality of legs 1114. In FIG. 12, the frame 1102 is supported by six legs 1114, although any number of legs useful for a particular application or needed to support a particular size and style of cart may be used. For example, the frame 1102 may be support by four legs 1114 at each corner. In FIG. 12, one leg 1114 is positioned at each of the corners of the frame 1102, at the opposing ends of each longitudinal side 1104 and 1106. Two additional legs 1114 are positioned at the opposing ends of the cross member 1112 to provide additional support. Each of the plurality of legs 1114 is connected to one of the longitudinal sides 1104, 1106 and/or the opposing ends 1108, 1110, and extends from a bottom surface 1116 of the frame 1102 downward, so as to engage the floor. The legs 1114 may have any cross-sectional shape known to provide good support for heavy objects. As illustrated in FIG. 12, each of the legs 1114 has a generally square cross shape. While not limited to such an embodiment, the legs 1114 may have a length of about 12 inches or less, preferably about 10 inches or less. This keeps the platform 1100 sufficiently elevated off of the ground so as to avoid being contaminated by any dirt or debris that are on the ground.

The frame 1102 further includes at least two side rails 1118 extending along each of the longitudinal sides 1104 and 1106. The side rails 1118 each have an upright portion 1120, an inwardly turned member 1122 and an inner guide edge 1124. The upright portion 1120 extends perpendicularly upward from the top surface 1103 of the frame 1102 and forms the outer edge of the side rails 1118. The inwardly turned member 1122 extends perpendicularly inwardly with respect to the upright portion 1120, so that the inwardly turned member 1122 is substantially parallel to and spaced apart from the top surface 1103 of the frame 1102. In this way, a channel 1126 is formed between the inwardly turned member 1122 and the top surface 1103 of the frame 1102.

As shown, the upright portion 1120 spaces the inwardly turned member 1122 apart from the top surface 1103 of the frame 1102 so that the inner guide edge 1124 may be aligned with rolling wheel guide assemblies (such as wheel guide assemblies 140 of FIG. 1) that may be attached to the main body of the transport device 1101. In this way, the inner guide edge 1124 allows the transport device 1101 to be slidably removed from the wheel base assembly 200 and on to the platform 1100. The inner guide edge 1124 also ensures that, one positioned on the platform 1100, the transport device 1101 is not able to slide horizontally relative to the sides 1104 and 1106 of the frame 1102 to prevent it from falling off of the platform 1100. Additionally, at least one stop tab 1128 may be positioned at one end 1110 of the frame 1102 to stop the transport device 1101 from moving any further forward once placed on the platform 1100. Alternatively, the frame 1102 may be designed without any stop tabs 1128, such that the transport device 1101 may be slidably transferred onto (and/or removed from) the platform 1110 at end 1108 and slidably removed from (and/or transferred onto) the platform 1100 at end 1110.

At least one of the opposing ends 1108 and 1110 of the frame 1102 preferably includes a hole 1130. The hole 1130 engages a locking mechanism on the cart, such as locking mechanism 300 (see FIG. 1), for releasably locking the transport device 1101 to the platform 1100. Specifically, looking to FIG. 4A, the locking mechanism 300 includes a locking rod 302. Once placed on the platform 1100, the locking rod 302 is lowered using a release knob 304, such that the distal end 312 of the locking rod 302 engages the hole 1130, thereby locking the transport device 1101 in place. This helps to further ensure that the transport device 1101 is held in place on the platform 1100.

Figure 13:
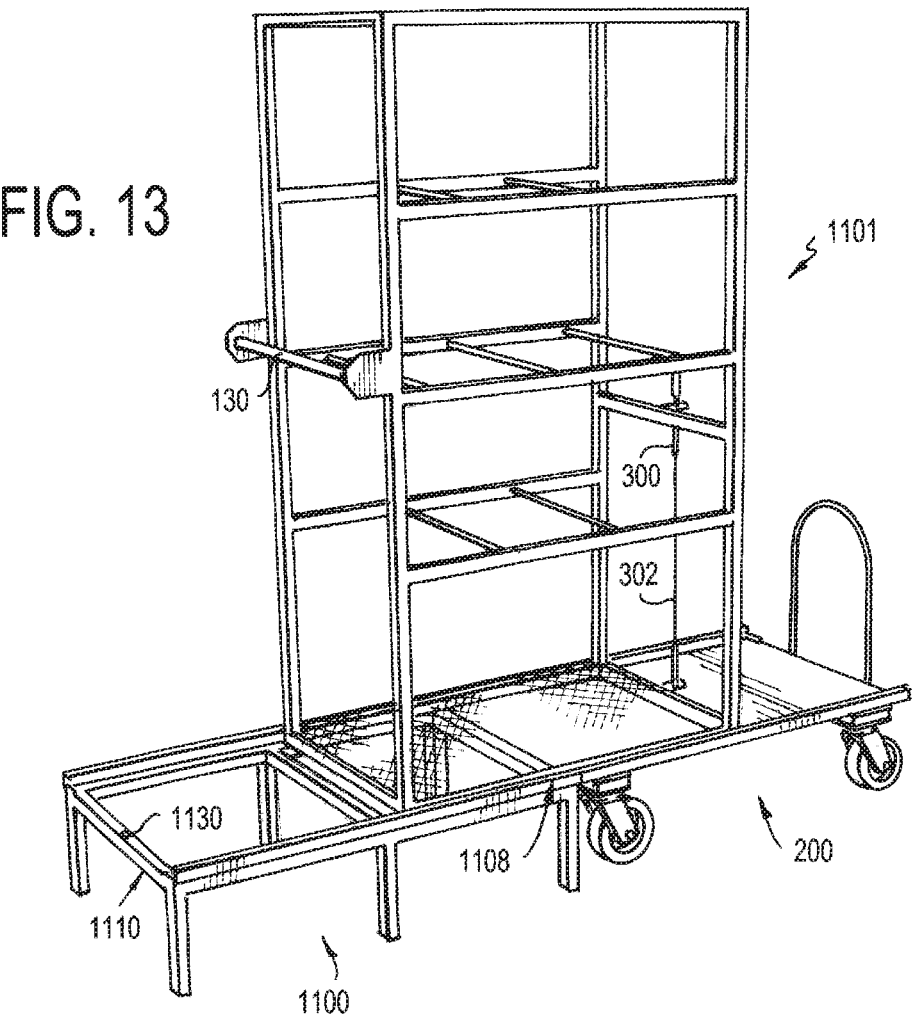
FIG. 13 is a perspective view of the cart of FIG. 11 being slidably removed from the wheel base on to the stationary platform.

In use, as illustrated in FIG. 13, the transport device 1101 is transported to one end 1108 of the platform 1100 using the wheel base assembly 200. The transverse front end 244 of the wheel base assembly 200 is aligned with the end 1108 of the platform 1100 such that they are in contact. Once the transport device 1101 is unlocked from the wheel base assembly 200, it is slid from the wheel base assembly 200 onto the platform 1100. Once the end of the transport device 1101 engages the stop tab(s) 1128, the release knob 304 is lowered, thus lowering the locking rod 302 into hole 1130 to lock the transport device 1101 into place on the platform 1100. The wheel base assembly 200 may then be transported away from the platform for further use.

Referring back to FIG. 12, the side rails 1118 on the frame 1102 of the platform 1100 help to guide the transport device 1101 onto the platform 1100 when it is slidably removed from the wheel base assembly 200. Using FIGS. 1 and 3 as an example, the guide wheels 142 of the transport device 1101 rotate along the guiderails 220 of the wheel base assembly 200 as the transport device 1101 is removed from the wheel base assembly 200 using handle 130. The guide wheel assemblies 140 support, transport, and guide the transport device 1101 as it slides along the platform 240 of the wheel base assembly 200, and allow the wheel base assembly 200 to slide beneath the transport device 1101. As the transport device 1101 slides onto the platform 1100, the guide wheels 142 engage the inner guide edge 1124 of the side rails 1118. Specifically, the guide wheels 142 are positioned in the channel 1126 to ensure that the transport device 1101 is centered on the platform 1100 and held in place. Once the transport device 1101 is slid all the way onto the platform 1100 and aligned with end 1110, the end of the transport device 1101 comes into contact with stop tab 1128 to ensure that the transport device 1101 is not pushed any further over the end 1110. As detailed above, the locking mechanism 300 is then activated to engage the hole 1130 to lock the transport device 1101 in place.

In operation, the platform 1100 is stationary. It can also be attached to a wall or floor. The transport device 1101, which is engaged with the wheel base assembly 200, is rolled to the platform 1100. The transport device 1101 is then slidably removed from the wheel base assembly 200 and onto the platform 1100. The wheel base assembly 200 may then be rolled away for further use.

The platform 1100 may be placed inside of or outside of a clean room environment for temporary holding and/or storage of various carts, such as transport device 1101. The platform 1100 and wheel base assembly 200 provide a system that allows for the temporary holding and storage, support, and transport of various carts in these environments.

Cleaning Device for Wheel Base Assembly

Another aspect of the invention, as illustrated in FIGS. 14A-B and FIGS. 15A-B, relates to a cleaning apparatus, such as a cleaning device 1400, for use on a wheel base assembly as disclosed herein, such as wheel base assembly 200. The cleaning device 1400 can be used for scraping off or removing contaminants from the transport device 1101 and/or for applying a disinfectant, such as an alcohol, to the transport device 1101. The cleaning device 1400 provides a surface across which the transport device 1101 slides when being transferred from the wheel base assembly 200 to the stationary platform 1100 or vice versa. The cleaning device 1400 contacts the bottom of the transport device 1101 and removes any dirt or debris from the bottom of transport device 1101, or disinfects the bottom of the transport device 1101, as it is transferred onto or off of the wheel base assembly 200. In this way, contamination of the clean room environment may be minimized.

Figure 14A:
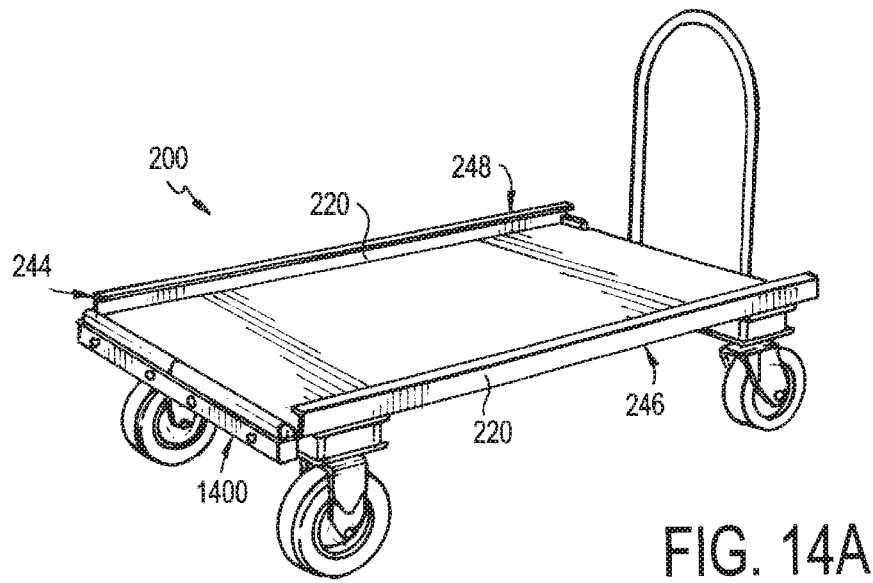
FIG. 14A is a perspective view of the wheel base assembly of FIG. 3 having a cleaning device attached thereto.

Referring to FIGS. 14A-B, the cleaning device 1400 is preferably attached to either the front end 244 or the rear end 242 of the wheel base assembly 200. The cleaning device 1400 should be attached to the end of the wheel base assembly 200 that is opposite the handle of the wheel base assembly 200, so that it engages the transport device 1101 as it is transferred onto the wheel base assembly 200. As illustrated in the figures, the cleaning device 1400 is attached to front end 244 of the wheel base assembly 200. The front end 244 of the wheel base assembly 200 includes a downwardly-projecting cross member 1402 to which the cleaning device 1400 is attached. The cross member 1402 extends between the two longitudinal sides 246, 248 of the wheel base assembly 200. In a preferred embodiment, the cross member 1402 extends all the way between the sides 246, 248 up to and adjacent the guiderails 220. In this way, the entire bottom surface of the transport device 1101 may be scraped as it is slidably transferred onto and off of the wheel base assembly 200.

In one embodiment, the cleaning device 1400 may be semi-permanently attached to the cross member 1402, such as by nails, screws, bolts, or similar mechanical attachment means. In FIG. 14B, the cleaning device 1400 is attached to the cross member 1402 using screws 1404. While four screws 1404 are illustrated, any number of screws 1404 may be used to attach the cleaning device 1400 to the cross member 1402. In another embodiment, the cleaning device 1400 may be attached to the cross member 1402 by welding, gluing, and other more permanent attachment means. In yet another embodiment, the cleaning device 1400 may be removably coupled to the cross member 1402 so as to allow for cleaning of the cleaning device 1400 components.

The cleaning device 1400 is illustrated in FIGS. 15A-B. In this embodiment, the cleaning device 1400 is formed of a base 1406 and two cleaning contacts 1408. However, the cleaning device 1400 may include any number of bases 1406 and cleaning contacts 1408. For example, the cleaning device 1400 may be formed of one base 1406 and one cleaning contact 1408, or one base 1406 and more than two cleaning contacts 1408. In another embodiment, the cleaning device 1400 may have more than one base 1406 which together hold one cleaning contact 1408, or the cleaning device 1400 may have more than one base 1406 each of which holds one cleaning contact 1408. In yet another embodiment, the cleaning device 1400 may not have a base 1406, and the cleaning contact(s) 1408 may be directly coupled to the cross member 1402. Alternatively, the cleaning contact(s) 1408 may be formed integrally with the base 1406 such that they are all one unitary piece.

The base 1406 functions to hold each of the cleaning contacts 1408 in place. The base 1406 has a trough shape with a bottom surface 1410 and two upwardly extending sides 1412, 1414, so as to sufficiently hold each of the cleaning contacts 1408 in place. The cleaning contact(s) 1408 sit within the base 1406, supported by the bottom surface 1410 and each of the sides 1412, 1414. Preferably, the cleaning contact(s) 1408 extend vertically above each of the sides 1412, 1414, such that a rounded, contacting portion 1416 is exposed at the top surface of each of the cleaning contacts 1408. The contacting portion 1416 contacts the bottom surface of the transport device 1101 so as to remove dirt and debris therefrom as the transport device 1101 slides across it. While the contacting portion 1416 is illustrated with a rounded shape, any shape which would sufficiently scrape of the bottom of the transport device 1101 may be used.

Each of the base 1406 and the cleaning contact(s) 1408 have through holes 1420 extending through a horizontal thickness thereof which receive the screws 1404. These through holes 1420 allow the entire cleaning device 1400 to be secured to the wheel base assembly 200. In use, the screws 1404 are positioned in the through holes 1420 and extend through the base 1406 and each of the cleaning contacts 1408 and into the cross member 1402. The screws 1404 hold each of the cleaning contacts 1408 to the base(s) 1406, and the coupled base 1406 and cleaning contacts 1408 to the cross member 1402.

In one embodiment, the base 1406 is preferably formed of the same material as the rest of the wheel base assembly 200, such as stainless steel. In one embodiment, the cleaning contact(s) 1408 are formed of an elastically deformable material, such that they can adequately contact the bottom surface of the transport device 1101. In one embodiment, for example, the cleaning contact(s) 1408 may be in the form of an applicator, such as a polyester sponge. The polyester sponge can be soaked with a cleaning agent/disinfectant, such as alcohol, before its use. In this way, when the transport device 1101 slides over the polyester sponge, the bottom of the transport device 1101 may be disinfected. In yet another embodiment, the cleaning contact(s) 1408 may be formed as a scraper or a scraping device that is formed of a more rigid material, such as silicone or rubber, to remove dirt or debris from the bottom of the transport device 1101 as the transport device 1101 engages the cleaning contact(s) 1408. In one embodiment, the cleaning device 1400 may have more than one cleaning contact 1408, such as an applicator (e.g., a polyester sponge) and a scraper used together.

The cleaning device 1400 preferably extends vertically above the flat top surface 241 of the wheel base assembly 200, such that when the transport device 1101 slides over the cleaning device 1400, enough pressure is applied by the cleaning device 1400 to the bottom surface of the transport device 1101 to remove any dirt or debris that may be adhered thereto, or to disinfect the transport device 1101. Although not limited to such an embodiment, the cleaning device 1400 may extend at least about 0.5 inches vertically above the flat top surface 241 of the wheel base assembly 200. The base 1406 may be flush with or below the top surface 241 of the wheel base assembly 200. When the transport device 1101 is positioned on the top surface 241 of the wheel base assembly 200, it no longer rests on the cleaning contact 1408 so as to not put any unnecessary pressure on the cleaning contact 1408. This also allows the user to service the cleaning contact 1408 (such as by cleaning with an alcohol wipe if the cleaning contact 1408 is formed of a more rigid material) when the transport device 1101 is positioned on the top surface 241 of the wheel base assembly 200. Alternatively, the base 1406 and/or the cleaning contact 1408 may be removably coupled to the cross member 1402 to allow for their quick release so they can be removed for cleaning or replaced.

In yet another embodiment, a cleaning device 1400 may also be attached to the stationary platform 1100 in the same manner the cleaning device 1400 is attached to the wheel base assembly 200. In this way, dirt and debris on the bottom of the transport device 1101 may be removed, or the transport device 1101 disinfected, once when the transport device 1101 is slidably removed from wheel base assembly 200, and again when the transport device 1101 is slidably transferred onto the stationary platform 1100.

Accordingly, the foregoing description and drawings should be considered as illustrative only of the principles of the invention. The invention may be configured in a variety of shapes and sizes and is not intended to be limited by the preferred embodiment. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

The invention claimed is:

1. A stationary platform for supporting a supply transport device, comprising:
   a frame having at least two longitudinal sides, a first end and a second opposing end, and a top surface and a bottom surface;
   a plurality of legs extending from the bottom surface of the frame to support the supply transport device on the frame, wherein the supply transport device is slidably received on the top surface of the frame
   a base component coupled to at least one of the first end and the second opposing end of the frame; and
   at least one cleaning contact positioned at the base component, wherein the at least one cleaning contact extends vertically above the top surface of the frame and is configured to clean a surface of the supply transport device as the supply transport device is loaded onto or unloaded from the frame.

2. The stationary platform of claim 1, further comprising at least one cross member extending perpendicularly between the at least two longitudinal sides.

3. The stationary platform of claim 2, wherein the at least two longitudinal sides, the first end and the second opposing end, and the at least one cross member form a rectangular shape having openings in a center thereof.

4. The stationary platform of claim 1, wherein the plurality of legs includes at least four legs, each of which is positioned at each end of the two longitudinal sides.

5. The stationary platform of claim 2, wherein the plurality of legs includes at least two legs positioned at each end of the at least one cross member.

6. The stationary platform of claim 1, further comprising at least two side rails extending along each of the two longitudinal sides of the frame.

7. The stationary platform of claim 6, wherein each of the at least two side rails includes an upright portion, an inwardly turned member, and an inner guide edge forming a channel to receive the supply transport device.

8. The stationary platform of claim 7, wherein the supply transport device includes a wheel guide assembly that is received in the channel.

9. The stationary platform of claim I, wherein the first end or the second opposing end includes a stop tab to prevent movement of the supply transport device in a direction parallel to the two longitudinal sides.

10. storage and transport system, comprising:
   a supply transport device;
   a stationary platform, comprising:
      a frame having at least two longitudinal sides, a first end and a second opposing end, and a top surface and a bottom surface,
      a plurality of legs extending from the bottom surface of the frame to support the supply transport device on the frame, wherein the supply transport device is slidably received on the top surface of the frame,
      a base component coupled to at least one of the first end and the second opposing end of the frame; and
      at least one cleaning contact positioned at the base component, wherein the at least one cleaning contact extends vertically above the top surface of the frame and is configured to clean a surface of the supply transport device as the supply transport device is loaded onto or unloaded from the frame; and
   a wheel base assembly comprising a platform and a plurality of wheels attached thereto, wherein the wheel base assembly is configured to transport the supply transport device to the stationary platform, wherein the supply transport device is slida.bly removed from the wheel base assembly to the stationary platform for temporary holding or storage.

11. The storage and transport system of claim 10, wherein an end of the wheel base assembly is aligned with either the first end or the second opposing end of the frame of the platform so as to slidably transfer the supply transport device from the wheel base assembly to the stationary platform.

12. The storage and transport system of claim 10, wherein the stationary platform further comprises at least two side rails extending along each of the two longitudinal sides of the frame that provide a channel to receive the supply transport device.

13. The storage and transport system of claim 12, wherein the supply transport device includes a wheel guide assembly that is received in the channel when the supply transport device is slidably transferred from the wheel base assembly to the stationary platform.

14. A wheel base assembly for transporting a supply transport device, comprising:
   a wheel base having a top surface, a bottom surface, and two opposing ends, wherein the top surface of the wheel base assembly supports the supply transport device;
   a plurality of wheels coupled to the bottom surface of the wheel base;
   a base component coupled to at least one of the two opposing ends of the wheel base; and
   at least one cleaning contact positioned at the base component, wherein the at least one cleaning contact extends vertically above the top surface of the wheel base and is configured to clean a surface of the supply transport device as the supply transport device is loaded onto or unloaded from the wheel base.

15. The wheel base assembly of claim 14, comprising at least two cleaning contacts.

16. The wheel base assembly of claim 14, wherein the at feast one cleaning contact is formed of a polyester sponge.

17. The wheel base assembly of claim 14, further comprising a downwardly-extending cross member positioned at one end of the wheel base and extending between two longitudinal sides of the wheel base, wherein the base component is coupled to the downwardly-extending cross member.

18. The wheel base assembly of claim 14, wherein the base component and at least one cleaning contact are screwed to the wheel base.

19. The wheel base assembly of claim 14, wherein the at least one cleaning contact includes a rounded contacting portion for engaging a bottom surface of the supply transport device.

20. The stationary platform of claim 1, wherein said at least one cleaning contact comprises a scraping device that scraps a bottom surface of the supply transport device.

21. The storage and transport system of claim 10, wherein said at least one cleaning contact comprises a scraping device that scraps a bottom surface of the supply transport device.

22. The wheel base assembly of claim 14, wherein said at least one cleaning contact comprises a scraping device that scraps a bottom surface of the supply transport device.

23. The stationary platform of claim 1, wherein the supply transport device has a bottom surface, and said at least one cleaning contact cleans the bottom surface of the supply transport device as the supply transport device is loaded onto or unloaded from the frame.

24. The storage and transport system of claim 10, said supply transport device having a bottom surface, and said at least one cleaning contact cleans the bottom surface of the supply transport device as the supply transport device is loaded onto or unloaded from the frame.

25. The wheel base assembly of claim 14, wherein the supply transport device has a bottom surface, and said at least one cleaning contact cleans the bottom surface of the supply transport device as the supply transport device is loaded onto or unloaded from the frame.

26. The wheel base assembly of claim 17, wherein the plurality of egs includes at least two legs positioned at each end of the at lease one cross member.

27. The stationary platform of claim 14, wherein the first end or the second opposing end includes a stop tab to prevent movement of the supply transport device in a direction parallel to the two longitudinal sides.

* * * * *

UNITED STATES PATENT AND TRADEMARK OFFICE
CERTIFICATE OF CORRECTION

| | | |
|---|---|---|
| PATENT NO. | : 11,555,576 B2 | Page 1 of 1 |
| APPLICATION NO. | : 15/637059 | |
| DATED | : January 17, 2023 | |
| INVENTOR(S) | : Jeffrey Churchvara et al. | |

It is certified that error appears in the above-identified patent and that said Letters Patent is hereby corrected as shown below:

In the Claims

In Column 25, Line 5, in Claim 10, insert -- A -- before -- storage and transport system, comprising: --

Signed and Sealed this
Seventh Day of May, 2024

Katherine Kelly Vidal
*Director of the United States Patent and Trademark Office*